(12) United States Patent
Starrett et al.

(10) Patent No.: US 11,175,751 B2
(45) Date of Patent: Nov. 16, 2021

(54) MULTI-PERIPHERAL POSITION-BASED SYNCHRONOUS LIGHTING

(71) Applicant: Logitech Europe S.A., Lausanne (CH)

(72) Inventors: Mark Starrett, Fremont, CA (US);
Jacob Kottage, Newark, CA (US);
Andrew Durrer, Santa Clara, CA (US);
Andrew Coonrad, Newark, CA (US);
Curtis Brown, San Jose, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/798,054

(22) Filed: Feb. 21, 2020

(65) Prior Publication Data
US 2021/0263600 A1    Aug. 26, 2021

(51) Int. Cl.
| | | |
|---|---|---|
| *F21S 10/00* | (2006.01) | |
| *G06F 3/0354* | (2013.01) | |
| *G06F 13/36* | (2006.01) | |
| *G08B 5/36* | (2006.01) | |
| *G06F 3/0487* | (2013.01) | |
| *G06F 3/039* | (2013.01) | |

(52) U.S. Cl.
CPC ........ *G06F 3/03543* (2013.01); *G06F 3/0395* (2013.01); *G06F 3/0487* (2013.01); *G06F 13/36* (2013.01); *G08B 5/36* (2013.01)

(58) Field of Classification Search
None
See application file for complete search history.

(56) References Cited

U.S. PATENT DOCUMENTS

| | | | |
|---|---|---|---|
| 9,474,137 B1* | 10/2016 | Wein | G06K 19/04 |
| 2009/0088258 A1 | 4/2009 | Saunders et al. | |
| 2009/0293118 A1 | 11/2009 | Yan et al. | |
| 2010/0066695 A1 | 3/2010 | Miyazaki | |
| 2012/0032979 A1 | 2/2012 | Blow et al. | |
| 2016/0125695 A1 | 5/2016 | Nguyen | |
| 2017/0185287 A1 | 6/2017 | Unruh et al. | |
| 2018/0225230 A1 | 8/2018 | Litichever et al. | |
| 2019/0392180 A1 | 12/2019 | Dasarathan | |

OTHER PUBLICATIONS

Non-Final Office Action for U.S. Appl. No. 16/798,048, dated Mar. 4, 2021, 12 pages.
Non-Final Office Action for U.S. Appl. No. 16/798,051, dated Mar. 17, 2021, 10 pages.

* cited by examiner

*Primary Examiner* — John F Mortell
(74) *Attorney, Agent, or Firm* — Kilpatrick Townsend & Stockton LLP

(57) ABSTRACT

A method can include: determining a physical location of each of a plurality of peripheral devices communicatively coupled to a host computing device; generating a lighting sequence configured to activate visual output elements on the each of the plurality of peripheral devices, wherein the lighting sequence is a time based sequence that traverses the plurality of peripheral devices; and modifying a timing parameter of the lighting sequence based on the respective physical location of each of the plurality of peripheral devices. In some cases, modifying the lighting sequence can include: determining a distance between at least two of the plurality of peripheral devices and modifying the timing parameter of the sequential pattern based on the distance between the at least two of the plurality of peripheral devices.

17 Claims, 20 Drawing Sheets

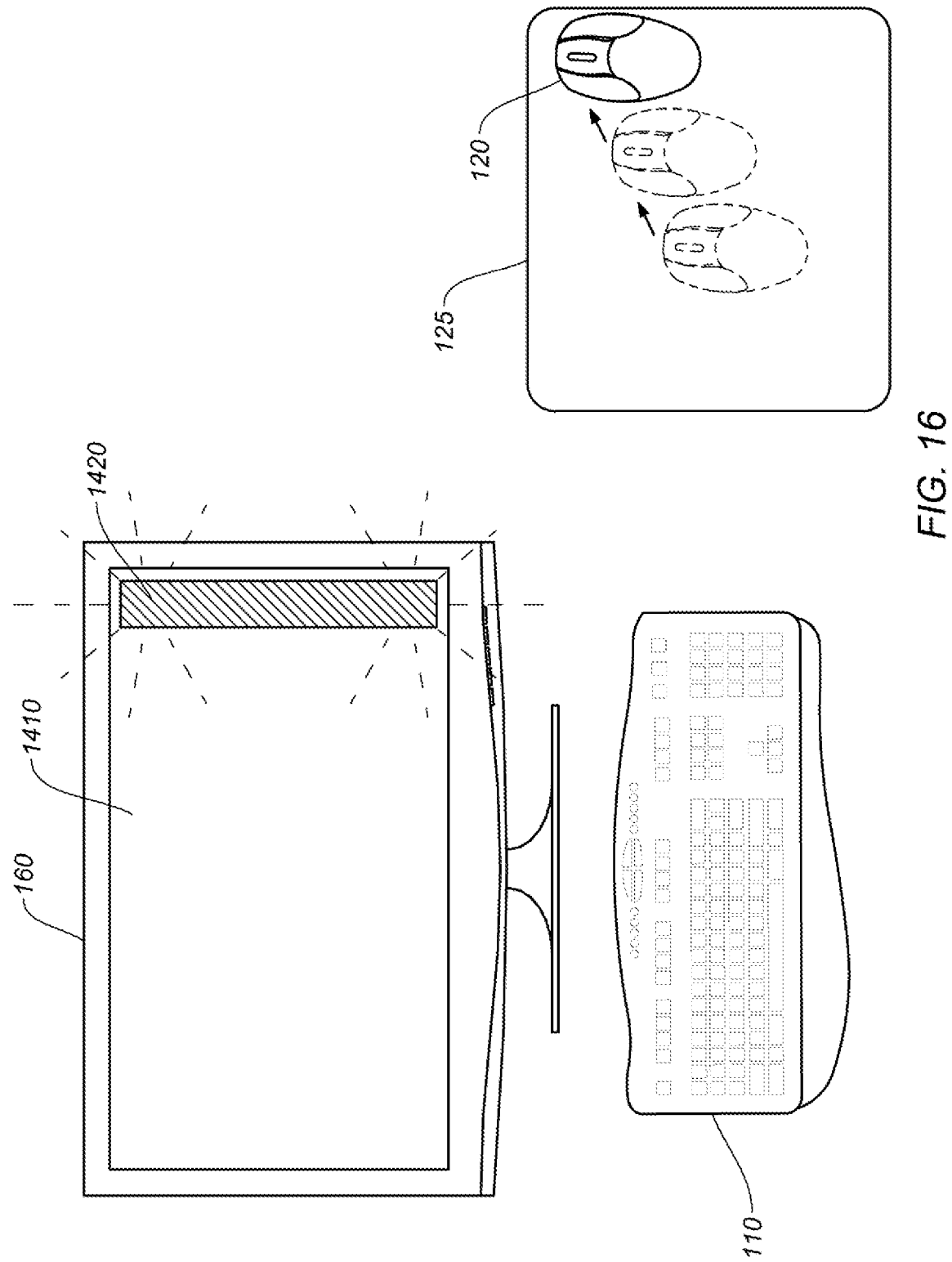

MULTI-PERIPHERAL POSITION-BASED SYNCHRONOUS LIGHTING

CROSS-REFERENCES TO RELATED APPLICATIONS

The following three U.S. patent applications listed below (which includes the present application) are being filed concurrently, and the entire disclosures of the other applications listed below are incorporated by reference into this application in their entirety for all purposes:
- application Ser. No. 16/798,048, filed Feb. 21, 2020, entitled "SYSTEM AND METHOD FOR FUNCTION-BASED LIGHTING OUTPUT SCHEMAS FOR PERIPHERAL DEVICES";
- application Ser. No. 16/798,051, filed Feb. 21, 2020, entitled "DISPLAY ADAPTATION ON A PERIPHERAL DEVICE"; and
- application Ser. No. 16/798,054, filed Feb. 21, 2020, entitled "MULTI-PERIPHERAL POSITION-BASED SYNCHRONOUS LIGHTING".

BACKGROUND

A computer peripheral device can be any device that provides input and/or output for a host computing device (a "computer"). Common peripheral devices include keyboards, mice, speakers, displays (e.g., computer monitors, televisions, mobile phones, smart watches, etc.). Some computer peripheral devices are conventionally configured as input devices (e.g., keyboards, mice, keypads) and others are often configured as output devices (e.g., video displays, speakers, etc.). Some computer peripheral devices (also referred to as "peripherals," "computer peripherals," "peripheral devices," etc.) can be configured both input and output devices (often referred to as "I/O devices") because they provide both input and output from a host computing device. One conventional example is an external hard drive, which provides both input and output data.

Some computer peripheral devices may be configured as I/O devices that interact with or perform functions according to one or more human senses such as human vision (e.g., displays, image sensors), hearing (e.g., speakers, microphone), and touch (e.g., keyboards, touch-sensitive interfaces, haptic feedback, etc.). In some cases, peripheral devices often incorporate one or more output lights (e.g., typically light emitting diodes (LEDs)) to provide an aesthetic effect or to convey information (e.g., the peripheral device is powered on, a particular operational mode is selected, etc.). In some contemporary devices, LED lighting may be used to provide aesthetically pleasing visual effects including multiple colors, blinking, wave effects, or the like. Despite the many advances, there is considerable untapped potential in both aesthetic and functional lighting in computer peripheral lighting and more sophisticated implementations are needed.

BRIEF SUMMARY

In certain embodiments, a computer-implemented method comprises: determining a physical location of each of a plurality of peripheral devices communicatively coupled to a host computing device; generating a lighting sequence configured to activate visual output elements on the each of the plurality of peripheral devices, wherein the lighting sequence is a time based sequence that traverses the plurality of peripheral devices; and modifying a timing parameter of the lighting sequence based on the respective physical location of each of the plurality of peripheral devices. In some cases, modifying the lighting sequence can include: determining a distance between at least two of the plurality of peripheral devices; and modifying the timing parameter of the lighting sequence based on the distance between the at least two of the plurality of peripheral devices. Determining a respective physical location of each of the plurality of peripheral devices includes receiving location data from a graphical user interface (GUI) configured to receive inputs from a user, the location data including a physical location of each of the plurality of peripheral devices. In some aspects, determining a respective physical location of each of the plurality of peripheral devices includes receiving location data for each of the plurality of peripheral devices from the plurality of peripheral devices via radio frequency (RF), infra-red (IR), or acoustic communication protocols. In further implementations, determining a respective physical location of each of the plurality of peripheral devices includes receiving image data from one or more image sensors, the image data including pixel data showing the physical location of each of the plurality of peripheral devices. The image data can include color data and intensity data for each of the visual output elements on the plurality of peripheral devices, where the method further comprises: modifying the color output and intensity output of the visual output elements based on the color data and intensity data. Modifying the color output and intensity output may include at least one of: normalizing color output or intensity output of the visual output elements; increasing the intensity output of the visual output elements based on their physical location; or modifying a color output or intensity output based on an ambient lighting. The visual output elements can include at least one of a light emitting diode (LED) or a liquid crystal display (LCD).

In some embodiments, the method may further include receiving location data from a position sensor on a computer mouse, the computer mouse being one of the plurality of peripheral devices, and modifying a lighting output schema for the computer mouse based on the location of the computer mouse relative to the other peripheral devices of the plurality of peripheral devices. In some cases, modifying a lighting output schema for the computer mouse is further based on the location of the computer mouse relative to its position on a mouse pad.

In certain embodiments, a system can comprise: one or more processors and one or more machine-readable non-transitory storage mediums that include instructions configured to cause the one or more processors to perform operations including: determining a physical location of each of a plurality of peripheral devices communicatively coupled to a host computing device; generating a lighting sequence configured to activate visual output elements on the each of the plurality of peripheral devices, wherein the lighting sequence is a time based sequence that traverses the plurality of peripheral devices; and modifying a timing parameter of the lighting sequence based on the respective physical location of each of the plurality of peripheral devices. Modifying the lighting sequence can include, but is not limited to, determining a distance between at least two of the plurality of peripheral devices and modifying the timing parameter of the lighting sequence pattern based on the distance between the at least two of the plurality of peripheral devices. In some aspects, determining a respective physical location of each of the plurality of peripheral devices includes at least one of: receiving location data from a graphical user interface (GUI) configured to receive inputs from a user, the location data including a physical location of each of the plurality of peripheral devices, receiving location data for each of the plurality of peripheral devices from the plurality of peripheral devices via radio frequency (RF), infra-red (IR), or acoustic communication protocols, or receiving image data from one or more image sensors, the image data including pixel data showing the physical location of each of the plurality of peripheral devices.

The image data can include color data and intensity data for each of the visual output elements on the plurality of peripheral devices, wherein the instructions can be further configured to cause the one or more processors to perform operations including modifying the color output and intensity output of the visual output elements based on the color data and intensity data. Modifying the color output and intensity output can include at least one of: normalizing color output or intensity output of the visual output elements, increasing the intensity output of the visual output elements based on their physical location, or modifying a color output or intensity output based on an ambient lighting. In some implementations, the instructions can be further configured to cause the one or more processors to perform operations including: receiving location data from a position sensor on a computer mouse, the computer mouse being one of the plurality of peripheral devices and modifying a lighting output schema for the computer mouse based on the location of the computer mouse relative to the other peripheral devices of the plurality of peripheral devices. Modifying a lighting output schema for the computer mouse can be further based on the location of the computer mouse relative to its position on a mouse pad.

In further embodiments, a non-transitory computer-program product tangibly embodied in a machine-readable non-transitory storage medium can include instructions configured to cause one or more processors to perform operations including: determining a physical location of each of a plurality of peripheral devices communicatively coupled to a host computing device; generating a lighting sequence configured to activate visual output elements on the each of the plurality of peripheral devices, wherein the lighting sequence is a time based sequence that traverses the plurality of peripheral devices; and modifying a timing parameter of the lighting sequence based on the respective physical location of each of the plurality of peripheral devices. The modifying the lighting sequence can include determining a distance between at least two of the plurality of peripheral devices, and modifying the timing parameter of the lighting sequence pattern based on the distance between the at least two of the plurality of peripheral devices.

In certain embodiments of the computer-program product, determining a respective physical location of each of the plurality of peripheral devices may include at least one of: receiving location data from a graphical user interface (GUI) configured to receive inputs from a user, the location data including a physical location of each of the plurality of peripheral devices; receiving location data for each of the plurality of peripheral devices from the plurality of peripheral devices via radio frequency (RF), infra-red (IR), or acoustic communication protocols; or receiving image data from one or more image sensors, the image data including pixel data showing the physical location of each of the plurality of peripheral devices. The image data can include color data and intensity data for each of the visual output elements on the plurality of peripheral devices, wherein the instructions can be further configured to cause the one or more processors to perform operations including modifying the color output and intensity output of the visual output elements based on the color data and intensity data, wherein modifying the color output and intensity output includes at least one of: normalizing color output or intensity output of the visual output elements, increasing the intensity output of the visual output elements based on their physical location, or modifying a color output or intensity output based on an ambient lighting, according to certain embodiments. The instructions may be further configured to cause the one or more processors to perform operations including: receiving location data from a position sensor on a computer mouse, the computer mouse being one of the plurality of peripheral devices and modifying a lighting output schema for the computer mouse based on the location of the computer mouse relative to the other peripheral devices of the plurality of peripheral devices.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIG. 16 shows how a lighting output schema can be modified based on a location of certain peripheral devices relative to one another, according to certain embodiments.

Throughout the drawings, it should be noted that like reference numbers are typically used to depict the same or similar elements, features, and structures.

DETAILED DESCRIPTION

Figure 1:
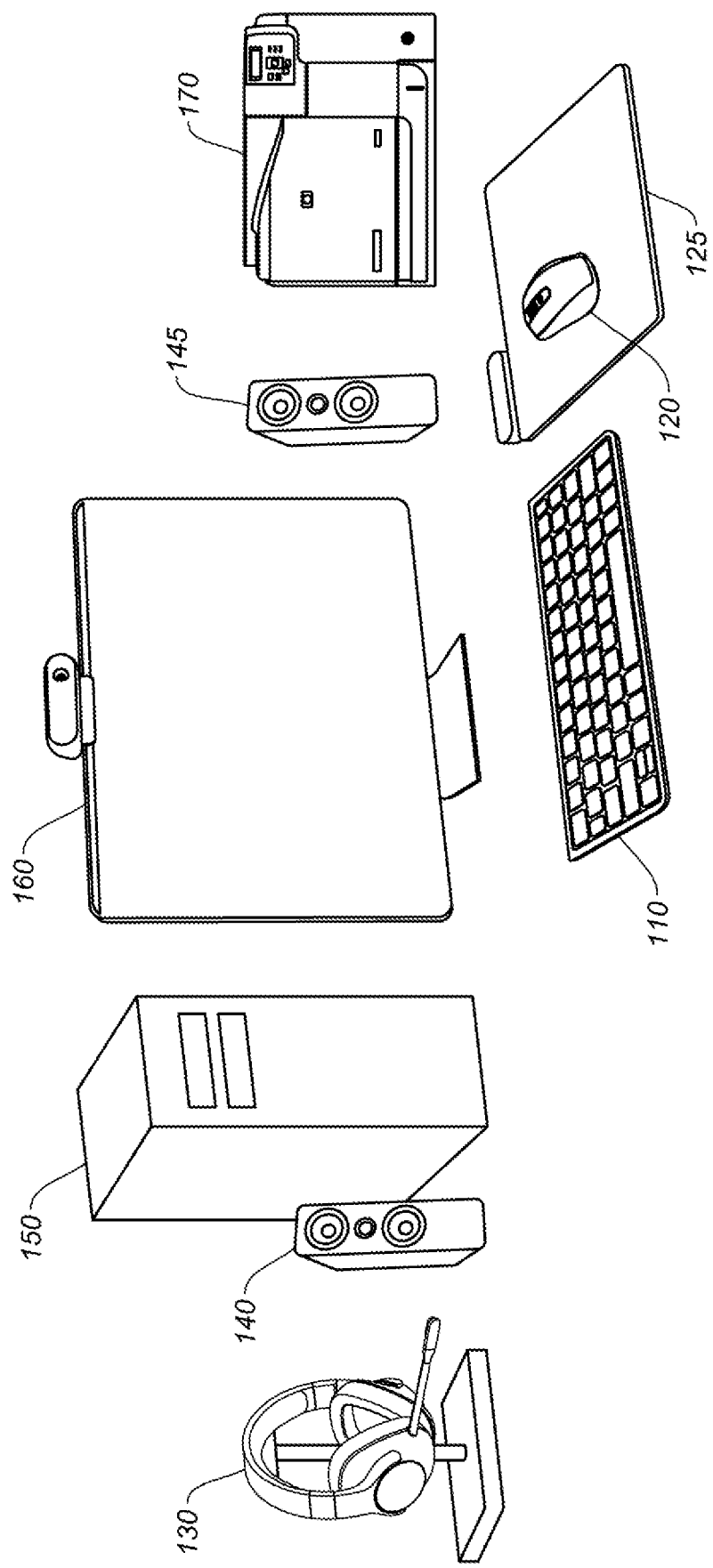
FIG. 1 shows an example of a computing system that can include any of a variety of host computing devices and peripheral devices that can be configured to perform aspects of the various inventions described herein.

Aspects of the present disclosure relate generally to computers and peripheral devices, and more particularly to lighting schemas, according to certain embodiments.

In the following description, various examples of lighting schemas on peripheral devices are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Some aspects of the myriad inventions presented herein relate to a method that includes the interception of a command generated by a peripheral device configured, for example, to control a software component on a host computing device (see, e.g., FIG. 4). One example, for instance, may be the interception of a volume up command from a keyboard. The method can include determining the function (e.g., volume up command) and the intended destination of the command (e.g., a media player operating on a laptop computer). An output light schema can then be generated based on the determined function. For example, visual output elements (e.g., LEDs) on the keyboard (or multiple peripheral devices) may display what appears to be an animated upwards arrow to represent the "volume up" command. The intercepted command can then be sent to its intended destination to operate as intended (e.g., increase the volume on the media player). The interception of the command can be performed independent of the host computing device. For example, the peripheral device (e.g., keyboard) generating the command (e.g., human interface device command) may intercept the command, perform the function based lighting schema, and submit the command for implementation on the host computing device without the host computer device being aware of the interception.

In some embodiments, confirmation data can be requested from the destination device to determine whether a function of a command can be performed. If not, the command can be prevented from being sent. For example, if a user enters a "favorite" selection key on a keyboard for saving a current website, but the software being controlled by the keyboard does not recognize the command, the keyboard may first request confirmation data from the software to determine if the "favorite" selection key is recognized, and may prevent the command from being send if the software does not recognize it. In certain cases, the lighting schema may or may not be performed based on this outcome. Other common functions that may be intercepted may include media control functions, application selection functions, host selection functions, input or output selection functions, macro functions, or more. Some common lighting schemas may include the modification of a lighting pattern, color schema, image intensity, lighting position or dimensions, or the like. Typically, the lighting schema is often related to the function and/or conveys the function to the user with the visual lighting elements. Common peripheral devices that can perform the method above include keyboards, computer mice, keypads, touchpads, remote controls, game controllers, or the like. More aspects and functionality of the concepts described above are further described below in greater detail, at least with respect to FIGS. 4-6.

In some embodiments, lighting output schemas can be designed to control visual output elements across any number of peripheral and/or host computing devices to create a rich and engaging array of light patterns, sequences, colors, and the like, that can markedly enhance the user experience (UX) in a computing system environment. In some cases, however, the some or all of the visual output elements may be obscured from the view of the user. For example, lighting output schemas that light visual output elements (e.g., LEDs) on a keyboard or computer mouse may be obscured by the user's hand. In some instances, the lighting output schema may be particularly important to the user. For example, a lighting output schema may light certain LEDs on a keyboard that indicate when certain character abilities in a competitive gaming session are available. In such cases, it may be advantageous to move the lighting output schema to another location to ensure that it can be viewed by the user (see, e.g., FIG. 8). The lighting output schema (e.g., a configuration of a number of visual output elements) may simply be moved and reproduced in substantially the same way (see, e.g., FIG. 9). In some cases, the lighting output schema may be resized (see, e.g., FIG. 10) or re-dimensioned (see, e.g., FIG. 11) to accommodate available visual output elements. In some cases, it may be advantageous to present the lighting output schema on a different device (see, e.g., FIG. 12). Typically, in order to effectively relocate and/or modify a lighting output schema to minimize and/or reduce the obstruction, the extent of the obstruction is characterized to determine how far and in what manner the output needs to be modified. These concepts are further described in the non-limiting embodiments that follow, including at least FIGS. 7-12.

Some embodiments may be directed to synchronizing a lighting output schema across multiple peripheral devices to create a visually appealing and uniform aesthetic effect, as described below with respect to FIG. 13. In some aspects, a timing of a lighting output schema that traverses multiple peripheral devices may depend on a physical distance between the peripheral devices. For example, a light-based wave effect configured to traverse across a plurality of peripheral devices (e.g., speakers, headset, keyboard, mouse, etc.) may be configured to take longer to traverse peripheral devices that are physically spaced farther apart than peripheral device that are spaced closer together, as described below with respect to FIGS. 15A-15B. In some implementations, the physical distance between the peripheral devices (and the host computing device) may be manually entered via a GUI (see, e.g., FIG. 14A), by RF communication such as time-of-flight (TOF) measurements (see, e.g., FIG. 14B), by image sensors (see, e.g., FIG. 14C), or other suitable method, as further described below. In some cases, lighting effects may be triggered based on a movement of peripheral devices relative to one another. For example, moving a computer mouse too close to the keyboard or an edge of a charging pad may cause corresponding side of a display to light up (e.g., like a gaussing effect in cathode ray tube televisions) to warn a user to skate their mouse back to a center portion of the mouse pad (see, e.g., FIG. 15). These concepts and more are described below at least with respect to FIGS. 13-16.

FIG. 1 shows an example of a computing system 100 that can include any of a variety of host computing devices and peripheral devices that can be configured to perform aspects of the various inventions described herein. Computing system 100 shows a host computing device (shown as a desktop computer) 150 and a number of peripheral devices communicatively coupled to the host computing device, include a keyboard 110, a computer mouse 120 configured on a powered mouse pad 125, a wireless headset 130, left audio speaker 140, right audio speaker 145, a display 160, and a printer 170. Although the host computing device is shown as a desktop computer, other types of host computing devices can be used including gaming systems, laptop computers, set top boxes, entertainment systems or any other suitable host computing device (e.g., smart phone, smart wearable, or the like). In some cases, multiple host computing devices may be used and one or more of the peripheral devices may be communicatively coupled to one or both of the host computing devices (e.g., a mouse may be coupled to multiple host computing devices). A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device to control the one or more peripheral input devices.

A typical peripheral device can include any suitable input peripheral, output peripheral or input/output peripheral device including those shown or any peripheral device not shown (e.g., game controller, remote control, wearables (e.g., gloves, watch, head mounted display), AR/VR controller, stylus device, gaming pedals/shifters, or the like. A peripheral input device may be referred to as an "input device," "peripheral device," "peripheral," or the like. It should be understood that although the majority of embodiments depicted herein are focused on applications involving computer-related peripheral devices, those of ordinary skill in the art would understand how to adapt the concepts applied to non-computer related applications. For instance, embodiments of the invention may apply the lighting schemas and methods to home entertainment systems and/or internet-of-things (IoT)-based systems.

Figure 2:
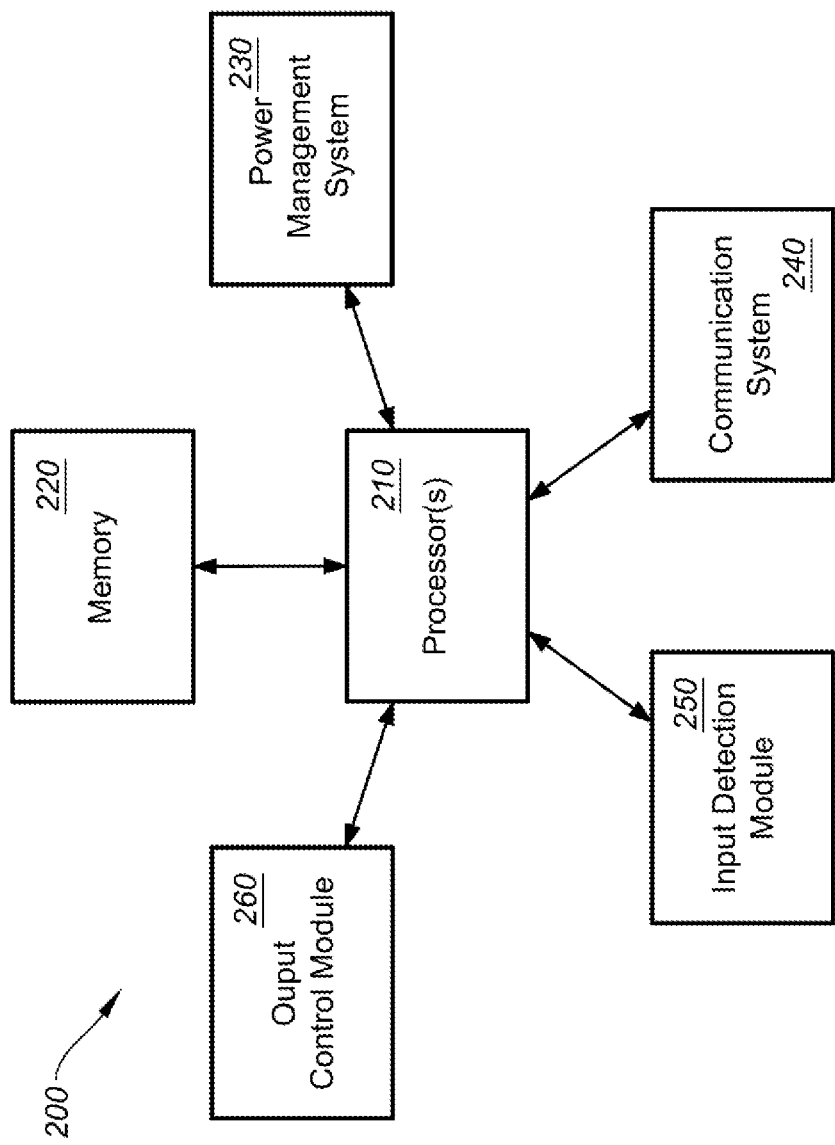
FIG. 2 shows a system for operating a peripheral input device, according to certain embodiments.

FIG. 2 shows a system 200 for operating a peripheral input device, according to certain embodiments. System 200 may be configured to operate any of the peripheral devices specifically shown and described herein (e.g., keyboard 110, mouse 120, speakers 140, 145, etc.) or peripheral not shown (e.g., IoT devices) but within the wide purview of the present disclosure. System 200 may include processor(s) 210, memory 220, a power management system 230, a communication system 240, an input detection module 250, and an output control module 260. Each of the system blocks 220-260 can be in electrical communication with the processor(s) 210 (e.g., via a bus system). System 200 may also include additional functional blocks that are not shown or discussed to prevent obfuscation of the novel features described herein. System blocks 220-260 may be implemented as separate modules, or alternatively, more than one system block may be implemented in a single module. In the context described herein, system 200 can be incorporated into any peripheral device described herein and may be configured to perform any of the various methods of controlling visual output elements on one or more peripheral devices, host computing devices, or the like, as would be appreciated by one of ordinary skill in the art with the benefit of this disclosure.

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 135 (e.g., system block 220-260). Alternatively or additionally, some of system blocks 220-260 may include an additional dedicated processor, which may work in conjunction with processor(s) 210. Processor(s) 210 may be local to the peripheral device (e.g., contained therein), may be external to the peripheral device (e.g., off-board processing, such as by a corresponding host computing device), or a combination thereof. As further described below, processor 302 of FIG. 3 may work in conjunction with processor 210 to perform some or all of the various methods (e.g., methods 400, 700, 1300, etc.) described throughout this disclosure. One of ordinary skill in the art would understand the many variations, modifications, and alternative embodiments that are possible. Processor(s) 210 may perform any of the various functions and methods (e.g., methods 400, 700, 1300, etc.) described and/or covered by this disclosure, and may operate to generate the various commands (e.g., HID commands, etc., in conjunction with any other resources/blocks in system 200) and corresponding functions described herein.

Memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution.

In some embodiments, memory 220 may store one or more lighting output schemas for one or more visual output elements (e.g., on the peripheral devices, host computing device, or a combination thereof) including wave effects, flashing effects, breathing effects, simulated light movement sequences, modulations of brightness and/or contrast, color changes/modulations, alphanumeric/symbolic patterns (e.g., similar to 7-segment displays), or the like. In some embodiments, memory 220 may store a location data corresponding to a physical location of one or more of the various devices (e.g., peripheral devices, host computing devices) relative to one another. The location data may be acquired from user input via a graphical user interface (GUI), from one or more images sensors (e.g., to generate image data showing the location of the various devices that the system), communication data (e.g., time-of-flight sensing between the various devices), or the like, as further described below and as would be appreciated by one of ordinary skill in the art with the benefit of this disclosure. In some aspects, memory 220 may store a location of visual output elements (e.g., LEDs, liquid crystal displays (LCDs), etc.) including which peripheral/host device they are located, where they are located on the corresponding peripheral/host device, or the like. In certain embodiments, memory 220 may store lighting output schemas that correspond to functions of various command. For example, a function of a volume up command implemented on a peripheral device may be to increase a volume setting on a media player. An example of a lighting output schema may be to light up a number of visual output element to look like an upwards facing arrow, or a lighting sequence that moves upwards, etc. Memory 220 may be configured to store intercepted commands (as further described below at least with respect to FIGS. 4-6), recent light output schemas, user created light output schemas, light output schemas associated with particular user profiles, or the like. In some embodiments, memory 220 may store resize and/or redimensioning data for modifying light output schemas, as further described below at least with respect to FIGS. 7-12. Memory 220 can be configured to store any data described throughout this document, as would be appreciated by one of ordinary skill in the art with the benefit of this disclosure.

Power management system 230 can be configured to manage power distribution, recharging, power efficiency, haptic motor power control, and the like. In some embodiments, power management system 230 can include a battery (not shown), a USB based recharging system for the battery (not shown), and power management devices (e.g., voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

In some aspects, power management system 230 may be configured to power off one or more visual output elements when it is determined that they are visually obscured by an object, as further described below in greater detail at least with respect to FIG. 7. For instance, when a user's hands are placed on a keyboard, some of the keys may be obscured by the user's hand (e.g., detected via contact, image sensors, etc., as further described below). Visual output elements (e.g., LEDs) under the user's hand that are configured to be turned on for a particular lighting output schema may be turned off to save power because they would not be visible by the user anyway. Visual output elements may be turned off individually, as part of a set of elements, or a combination thereof.

Communications system 240 can be configured to provide wireless communication with a corresponding host computing device (e.g., 105, 110, 115), or other devices and/or peripherals, according to certain embodiments. Communications system 240 can be configured to provide radio-frequency (RF), Bluetooth®, infra-red (IR), ZigBee®, or other suitable communication technology to communicate with other computing devices and/or peripheral devices. System 200 may optionally comprise a hardwired connection to the corresponding host computing device. For example, input device 135 can be configured to receive a Universal Serial Bus (USB) cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output control modules 260, etc.).

Input detection module 250 can control the detection of a user-interaction with input elements on input device 160. For instance, input detection module 250 can detect user inputs from keys, buttons, roller wheels, scroll wheels, touch pads, click wheels, dials, keypads, microphones, GUIs, touch-sensitive GUIs, image sensor based detection such as gesture detection (e.g., via webcam), audio based detection such as voice input (e.g., via microphone), or the like, as would be appreciated by one of ordinary skill in the art with the benefit of this disclosure.

In some embodiments, output control module 260 can control various outputs for a corresponding peripheral input device. For instance, output control module 260 may control a number of visual output elements (LEDs, LCDs), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

Figure 3:
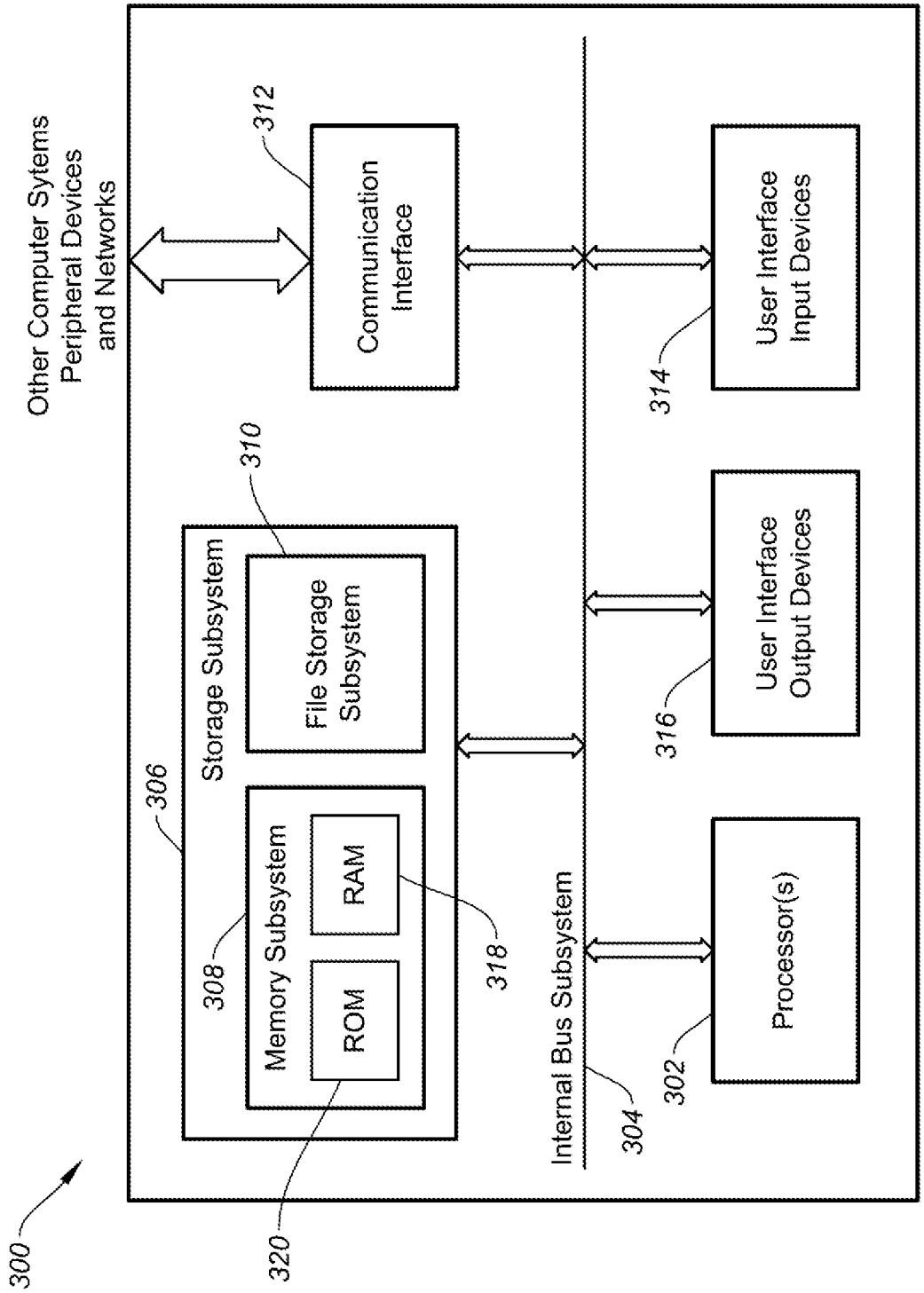
FIG. 3 is a simplified block diagram of a computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, a user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop (e.g., desktop 150) or laptop computer, mobile device (e.g., tablet computer, smart phone, mobile phone), wearable device, media device, or the like, in peripheral devices (e.g., keyboards, etc.) in certain implementations.

Processor(s) 302 can include application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 300 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus, Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Command Interception and Generation of Corresponding Lighting Output Schema

Figure 4A:
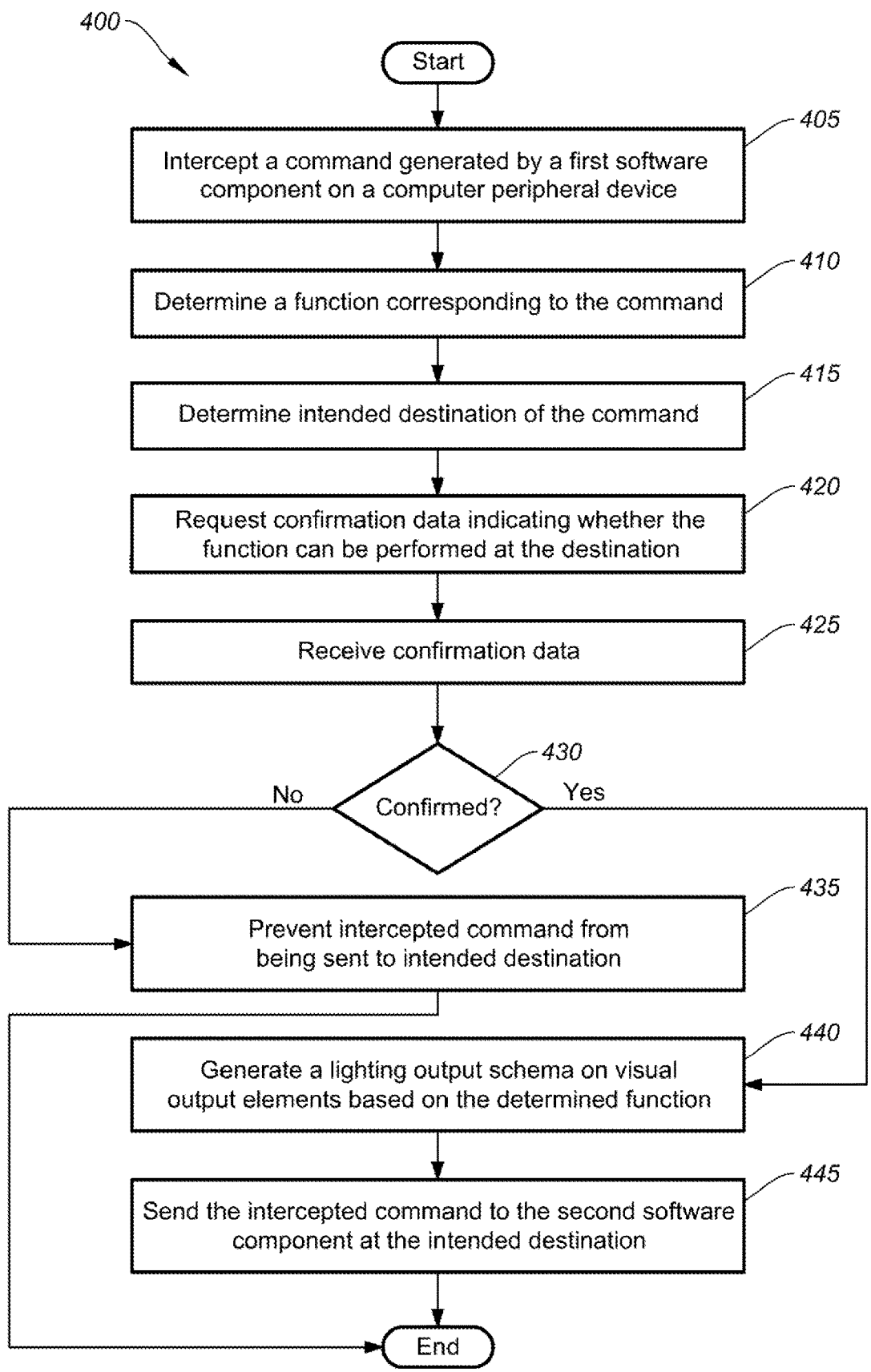
FIG. 4A is a simplified flow chart showing aspects of a method for generating a lighting output schema based on a function of a command, according to certain embodiments.

FIG. 4A is a simplified flow chart showing aspects of a method 400 for generating a lighting output schema based on a function of a command, according to certain embodiments.

Method 400 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 400 can be performed by a peripheral device (e.g., processor(s) 210 of keyboard 110), a host computing device (e.g., processors 302 of desktop 150), or a combination thereof (see, e.g., FIGS. 5 and 6), or other computing devices, as would be appreciated by one of ordinary skill in the art with the benefit of this disclosure.

At operation 405, method 400 can include intercepting a command generated by a computer peripheral device, according to certain embodiments. Intercepting, as used herein, can mean to cut off from an intended destination. A first software component may perform the intercepting operation. The command may be configured to control a second software component at an intended destination. By way of example, a "play" media function may be instantiated on a keyboard (e.g., peripheral device). Software or firmware on the keyboard can be configured to decode the button press on the keyboard and generate a corresponding "play" command configured to cause a media player (second software component) on another peripheral device or host computing device (the destination) to begin playing a media file. This command can be intercepted by software (the first software) on the keyboard or by software configured on a host computing device communicatively coupled to the keyboard and the destination (e.g., the other peripheral device or the host computing device itself). The command may be stored in a buffer, queue, or other suitable memory implementation, as would be appreciated by one of ordinary skill in the art with the benefit of this disclosure.

At operation 410, method 400 can include determining a function corresponding to the command, according to certain embodiments. Some examples of functions may include media controls (e.g., play, pause, fast forward, rewind, mute, volume, record, pan), audio input/output selection, video input/output selection, application selection/launch/close, caps lock, host selection (e.g., switching a computer mouse from a first host computing device to a second host computing device), dot-per-inch (DPI) settings on a display, display resolution, macros, or any other suitable function, according to certain embodiments.

In some implementations, interception may occur from an application programming interface (API) by the operating system (e.g., Windows®, Mac OS®, Linux, etc.), through a proprietary channel sent from the peripheral device the preferably only the software would recognize, through a defined protocol under the communication format being used, or the like. The interception may be temporarily recorded and acted upon in a manner that preferably does not delay the action and responds to the command in parallel (e.g., sending a "volume up" command, while contemporaneously implementing a lighting sequence on one or more peripheral device). Typically, the API (or other implement) passively "listens" or polls peripheral device data for requested events to act on without delaying the action to be executed and responding in parallel to the command.

Output schemas (e.g., visual output, audio output, haptic output, combinations thereof etc.) corresponding to a determined function (e.g., volume up manifested as a plurality of LEDs lit in a manner that resembles an upward arrow (see, e.g., FIG. 10) or a sequence of lights moving in a direction (see, e.g., FIG. 11)) can be stored in any number of manners on a peripheral device, on a host device, on a remote database, or any combination thereof. For instance, output schemas may be predefined in peripheral device firmware. In such cases, software operating on the host computing device may instruct the peripheral device to play one or more of the predefined output schemas after determining the function. In some aspects, a rewritable slot on the peripheral device may be configured such that the software operating on the host computing device may preemptively write and output effect (output schema) to the peripheral device's firmware for future usage, or it could be defined and stored in the host's memory in a database or look up table and streamed to the device for live play. One of ordinary skill in the art with the benefit of this disclosure would appreciate the many modifications, variations, and alternative embodiments thereof.

In some embodiments, the command may be handled different depending on what type of command it is and what mode is being used. For example, the command received from the peripheral device may be a standard HID (Human Interface Device) command or other. HID commands are generally standardized across multiple platforms and operating systems. Certain HID commands may also be latency sensitive (e.g., mouse clicks) wherein additional latencies introduced by software intercepting the command may be undesirable to a user. As such, method 400 can include different features to discriminate between latency sensitive and other commands. For certain commands that are determined to be latency sensitive, the command may be snooped by the software component residing on the host computer and allowed to be directly transmitted between the peripheral device and the host computer's operating system without being buffered. Certain other HID commands that are not considered latency sensitive may be stored and determination made as to whether the command is to be sent to the host computer's operating system as this may add delay.

In some embodiments, the software component may operate in a mode wherein functionality of one or more input keys (or other input element) of a peripheral device are temporarily modified such that the command enacted in response to the one or more input keys is different from what is physically indicated on the one or more input keys. While in this temporary mode, the software component may direct lighting elements to indicate the modified functionality. For example, numeric keys on a keyboard (1-0) may temporarily be reassigned to control volume in 10% increments (e.g., pressing key "6" would change the volume to 60%). While in this mode keys 1-0 may be illuminated differently (e.g., through different color(s), intensities, sequential patterns, etc.). If the software component receives the HID command indicated that button 6 has been pressed, it may intercept this command and instead determine and send command(s) to change the volume to be set to 60%. Additionally, the change in volume (or any other change) may be part of the output lighting pattern (e.g., numeric keys 1-0 may include a bar graph or their light intensity may change included the volume level).

In some embodiments, a peripheral device may include physical components, such as a DAC (digital to analog converter) and/or amplifier, for example, that may be controlled using input keys of the peripheral device. For example, a DAC and/or amplifier may be used to output audio to transducer directly from the peripheral device instead of from a remotely located DAC/amplifier. Although this is one example, many different components may be integrated into an input device and the control of such components may not be available using standard peripheral device input keys. Control of the physical components can be accommodated using the temporary mode described above to repurpose existing input keys.

At operation 415, method 400 can include determining the intended destination of the command, according to certain embodiments. For instance, a keyboard command for increasing brightness may be configured to control a brightness on a display (the destination). Software and/or firmware on the display and/or the host computing device communicatively coupled to the display may embody the second software component. The destination can be determined based on the command being detected, the APIs being used, and the mode of communication. For example, some commands may be configured for one destination (e.g., a keyboard may be configured to send commands directly to a host computing device that it is communicatively coupled to). In some cases, the destination can be determined based on the command title itself. For example, the command "microphone_mute" has the destination of a microphone, which is included in the title. In some cases, the destination may be determined based on the data carried by the command. For instance, the command "mute" may include data such as {enabled: true, device: "microphone"} in which the destination of a microphone is described in the contents of the command. The myriad ways that a destination can be detected would be understood by one of ordinary skill in the art with the benefit of this disclosure.

At operation 420, method 400 can include requesting confirmation data indicating whether the function can be performed at the destination, according to certain embodiments. For example, the peripheral device may query the host computing device (e.g., the destination) to determine if the function can be performed. When a media play command is instantiated, the host computing device may respond to the query that the command can be performed if a media player is currently operating, or that the command cannot be performed if the media player or similar application is not currently operating. In some cases, a confirmation may be performed indirectly. For example, a media pause command can be verified by accessing a microphone (e.g., headset 130) to listen for certain types of audio (e.g., music, television, news radio, etc.). If a particular type of audio is detected, confirmation may be established.

At operation 425, method 400 can include receiving the confirmation data, according to certain embodiments. Confirmation may be received from the second software, from the destination device (e.g., host computing device) or indirectly via audio and/or image detection. The manner in which the confirmation is received may depend on a variety of factors including the particular implementation and each command. For instance, it may depend on what APIs are available to supply and resubmit commands from third parties, other software applications, on the host, the host's operating system, and/or interfaces available for the peripheral devices. For proprietary peripheral devices, a custom interface can be used. In one example, software (e.g., operating on a peripheral device, on the host computing device, etc.) may receive a proprietary message from a peripheral devices that is sending a "microphone_mute" command. The software can then use an API provided by the host's OS to check if the host is coupled to any microphones in the system. If the system does not, the software would know that the mute command will fail so it may choose to not display an associate lighting output schema associated with the microphone mute command. In another example, software may receive an API command from the host's OS indicating that a user has triggered a "microphone_mute" command in their volume tool. Note that commands may also be referred to as "events." The software could then use a proprietary communication channel to ask a particular peripheral device if it supports mute and lighting. If the device does support both, it could then send the command to play the mute lighting effect (the lighting output schema). This is further addressed in the following operations.

At operation 430, when the confirmation data indicates that the function cannot be performed, method 400 can include preventing intercepted command from being sent to the intended destination (operation 435), according to certain embodiments. In such cases, the intercepted command (e.g., stored in a buffer or queue) may be discarded and/or reported to the user via video or audio messaging and method 400 ends.

At operation 430, when the confirmation data indicates that the function can be performed, method 400 can include generating an lighting output schema configured to be output on one or more visual output elements on one or more devices (e.g., peripheral devices and/or host computer devices) based on the determined function (operation 440), according to certain embodiments. Lighting output schemas may include lighting patterns, colors, sequences, the speed and/or modulation of sequences, a length of time the effect may last, etc., on one or more visual output elements on one or more devices (e.g., peripheral devices, host computing devices, etc.). The lighting output schema can then be executed on the peripheral and/or host computing devices.

Lighting output schemas may include non-lighting output schemas (e.g., audio or haptic output schemas). Lighting output schemas may be fixed, hard-wired effects built into the various peripheral devices themselves (e.g., stored on the device), they can be stored on the device in rewritable slots of memory that can be saved via software, they can be predefined or dynamically generated effects streamed to the device to play live from the software (e.g., stored on the host via the software), or the like.

At operation 445, method 400 can include sending the intercepted command to the second software component at the intended destination, according to certain embodiments.

It should be appreciated that the specific steps illustrated in FIG. 4A provide a particular method 400 for generating a lighting output schema based on a function of a command, according to certain embodiments. Other sequences of steps may also be performed according to alternative embodiments. Furthermore, additional steps may be added or removed depending on the particular applications. In some cases, a peripheral device where the command is generated may perform the operations of method 400. In some cases, a host computing device receiving the command may perform the operations of method 400. Some embodiments may employ a combination of peripheral devices and/or host computing devices to perform the operations of method 400. As such, the first software may be executed on the peripheral device, the host computing device, or a combination there (e.g., cooperating software on both devices). In some cases, the first and second software, and the peripheral that generated the command and the destination may all be on the same device. In certain embodiments, method 400 may be performed independently at a peripheral device such that a corresponding host device receives no indication of the interception and performs the function associated with the command when the command is received, while the peripheral device sends a separate command to the host computing device corresponding to the lighting output schema. In some cases, the confirmation steps may be skipped. Any combination of these embodiments can be used and one of ordinary skill in the art with the benefit of this disclosure would understand the many variations, modifications, and alternative embodiments thereof.

Figure 4B:
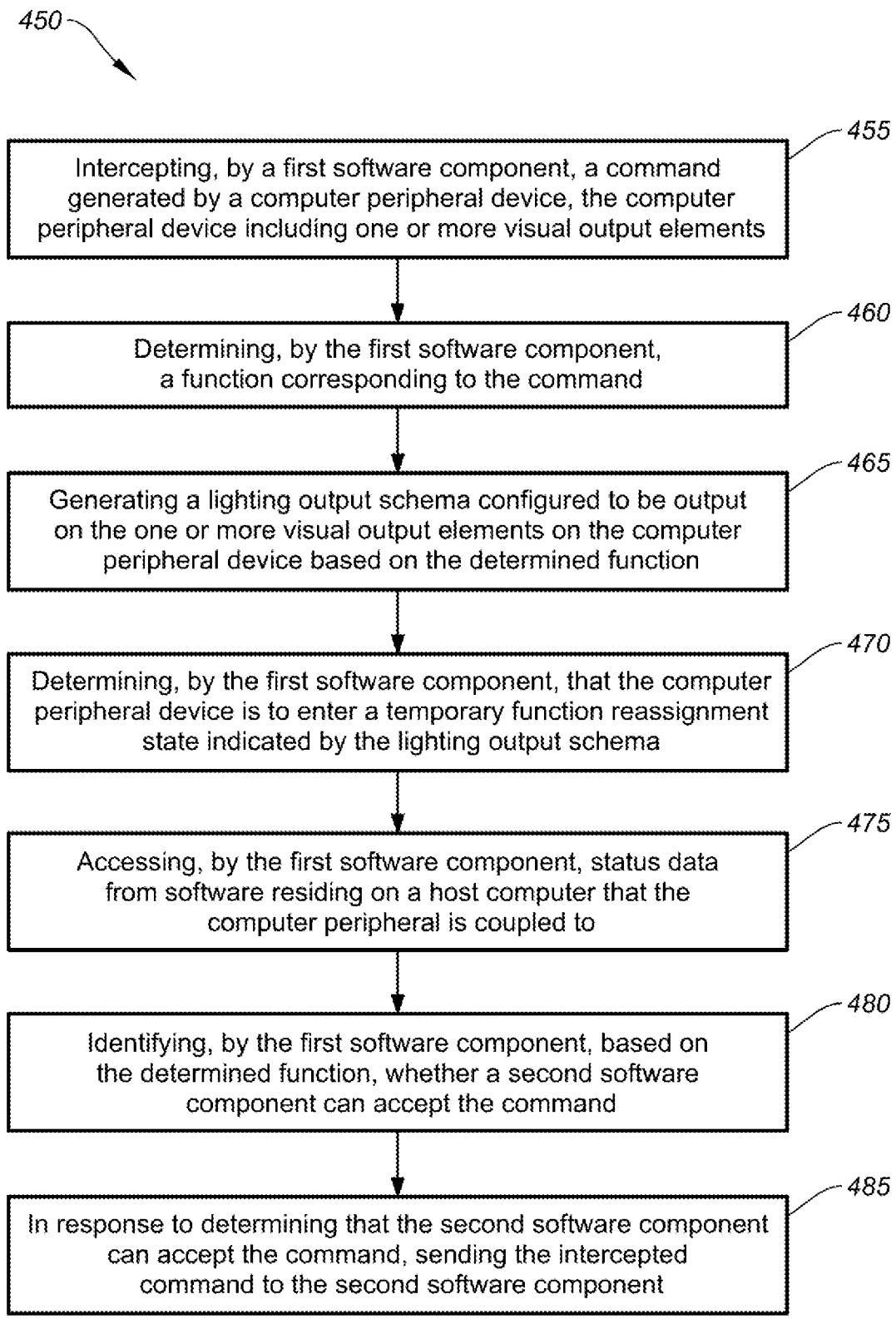
FIG. 4B is a simplified flow chart showing aspects of another method for generating a lighting output schema based on a function of a command, according to certain embodiments.

FIG. 4B is another simplified flow chart showing aspects of a method 450 for generating a lighting output schema based on a function of a command, according to certain embodiments. Method 450 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 450 can be performed by a peripheral device (e.g., processor(s) 210 of keyboard 110), a host computing device (e.g., processors 302 of desktop 150), or a combination thereof (see, e.g., FIGS. 5 and 6), or other computing devices, as would be appreciated by one of ordinary skill in the art with the benefit of this disclosure.

At operation 455, method 450 can include intercepting, by a first software component, a command generated by a computer peripheral device, the computer peripheral device including one or more visual output elements. The computer peripheral device may be a keyboard, computer mouse, keypad, touchpad, remote control, game controller, or other suitable input device, as described above.

At operation 460, method 450 can include determining, by the first software component, a function corresponding to the command. Some examples of functions may include media controls (e.g., play, pause, fast forward, rewind, mute, volume, record, pan), audio input/output selection, video input/output selection, application selection/launch/close, caps lock, host selection (e.g., switching a computer mouse from a first host computing device to a second host computing device), dot-per-inch (DPI) settings on a display, display resolution, macros, or any other suitable function, according to certain embodiments.

At operation 465, method 450 can include generating a lighting output schema configured to be output on the one or more visual output elements on the computer peripheral device based on the determined function. Lighting output schemas may include lighting patterns, colors, sequences, the speed and/or modulation of sequences, a length of time the effect may last, etc., on one or more visual output elements on one or more devices (e.g., peripheral devices, host computing devices, etc.). The lighting output schema can be executed on the peripheral and/or host computing devices.

Lighting output schemas may include non-lighting output schemas (e.g., audio or haptic output schemas). Lighting output schemas may be fixed, hard-wired effects built into the various peripheral devices themselves (e.g., stored on the device), they can be stored on the device in rewritable slots of memory that can be saved via software, they can be predefined or dynamically generated effects streamed to the device to play live from the software (e.g., stored on the host via the software), or the like.

At operation 470, method 450 can include determining, by the first software component, that the computer peripheral device is to enter a temporary function reassignment state indicated by the lighting output schema wherein, while in the temporary function reassignment state: the lighting output schema may be configured to provide an indication of an alternate function for an input key that is different from the determined function indicated by a symbol of the input key; and the software component may be configured to generate an alternate command in response to receiving the command from the computer peripheral device. In some cases, the alternate command can be configured to perform the alternate function. In certain embodiments, the command received from the computer peripheral device may be a HID command and the alternate command may not be an HID command.

At operation 475, method 450 can include accessing, by the first software component, status data from software residing on a host computer that the computer peripheral is coupled to, wherein the lighting output schema is generated based on the command received from the peripheral device and the status data from the software of the host computer.

At operation 480, method 450 can include identifying, by the first software component, based on the determined function, whether a second software component can accept the command.

At operation 485, in response to determining that the second software component can accept the command, sending the intercepted command to the second software component (operation 480). In such cases, the command can be a HID command and the second software component may be an operating system kernel, application software, or the like. In response to the confirmation data indicating that the second software component cannot perform the determined function, method 450 can include preventing the intercepted command from being sent to the second software component at the intended destination.

It should be appreciated that the specific steps illustrated in FIG. 4B provide a particular method 450 for generating a lighting output schema based on a function of a command, according to certain embodiments. Other sequences of steps may also be performed according to alternative embodiments. Furthermore, additional steps may be added or removed depending on the particular applications. For instance, some embodiments may not perform some of operations 455-485. In some cases, a peripheral device where the command is generated may perform the operations of method 450. In some cases, a host computing device receiving the command may perform the operations of method 450. Some embodiments may employ a combination of peripheral devices and/or host computing devices to perform the operations of method 450. As such, the first software may be executed on the peripheral device, the host computing device, or a combination there (e.g., cooperating software on both devices). In some cases, the first and second software, and the peripheral that generated the command and the destination may all be on the same device. In certain embodiments, method 450 may be performed independently at a peripheral device such that a corresponding host device receives no indication of the interception and performs the function associated with the command when the command is received, while the peripheral device sends a separate command to the host computing device corresponding to the lighting output schema. In some cases, the confirmation steps may be skipped. Any combination of these embodiments can be used and one of ordinary skill in the art with the benefit of this disclosure would understand the many variations, modifications, and alternative embodiments thereof.

Figure 5:
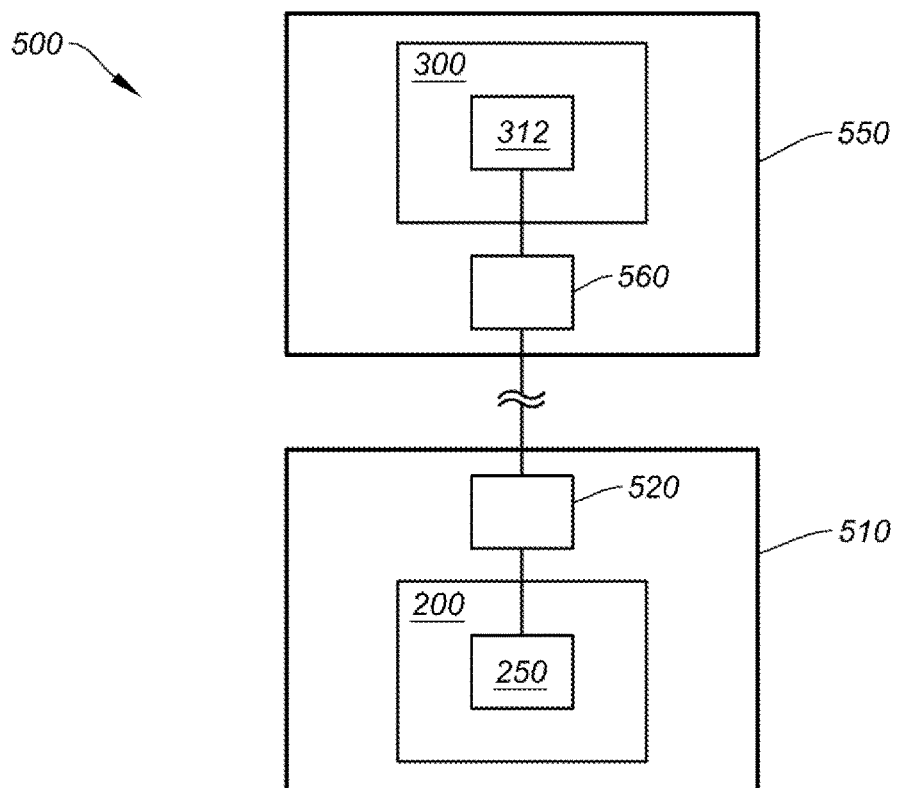
FIG. 5 shows a simplified block diagram of a system for intercepting a command from a peripheral device, according to certain embodiments.

FIG. 5 shows a simplified block diagram of a system 500 for intercepting a command from a peripheral device, according to certain embodiments. As described above, the system can determine a function and an intended destination of an intercepted command and generate a lighting output schema based on the determined function, where the lighting output schema can be used (e.g., as a control signal independent from the original command) to control one or more visual output element (LEDs) on one or more devices (e.g., peripheral device, host computing device), and the original command can be sent to its intended destination (second software component of the host computing device). Referring to FIG. 5, a peripheral device 510 (e.g., keyboard 110) is communicatively coupled to a host computing device 550 (e.g., host computer 150). Peripheral device 510 can include a system 200 with a communication system (module) 250 (as shown and described above with respect to FIG. 2) and a (first) software component 520 configured to intercept any command generated by peripheral device 510. Host computing device 550 (the command destination) can include a system 300 with a communication interface 312, as shown and described above with respect to FIG. 3, and a (alternative first) software component 560 configured to intercept any commands received from peripheral device 510. Communication interface 312 and communication system 312 can coordinate communication between peripheral device 510 and host computing device 550 using any suitable wireless (e.g., RE, Wi-Fi, 4G/LTE, Bluetooth®, NFC, etc.) or wired (e.g., USB, Ethernet, etc.) communication protocol. Although a single peripheral device 510 is shown in system 500, any number of peripheral devices may be communicatively coupled to host computing device 550, as would be appreciated by one of ordinary skill in the art with the benefit of this disclosure.

As indicated above, software component 520 can intercept commands generated by peripheral device 520 (e.g., generated by processor(s) 210). Intercepting, as defined above, can mean to cut off the command from an intended destination. Software component 520 may be configured in-series within the signal chain (the communication path between peripheral device 510 and host computing device 550) to ensure access to each command generated by system 200 to execute any of the various embodiments (e.g., method 400) described herein. In some aspects, software component 520 may be implemented as firmware, software, or a combination thereof. Software component 520 may intercept (cut off) any command from peripheral device 610, or in some cases, may access (e.g., read, sample) the command to perform method 400, but without impeding the command. That is, the command may pass through software component 520 unimpeded or diverged from its path. In such cases, method 400 may still receive the command, determine the associated function, and generate a lighting output schema, but may not interfere with the communication of the command between peripheral device 510 and host computing device 550. In some embodiments, software component 520 may be a standalone entity, or may be a part of another component. For instance, software component 520 may be stored and executed from memory 220.

In certain embodiments, the software component (e.g., the "alternative" first software component 560) may exist in the host computing device (e.g., the destination device) to intercept the command at the back end of the communication. Software component 560 may be installed on host computing device 550 as a separate program, integrated with the operating system of host computing device 550 (e.g., stored and executed from storage subsystem 306), or other suitable implementation, as would be appreciated by one of ordinary skill in the art with the benefit of this disclosure. Software component 560 may be configured in series with the communication path between peripheral device 510 and host computing device 550 to ensure access to each command sent between them. In some embodiments, software component 560 may be configured as a standalone entity outside of both peripheral device 510 and host computing device 550, but still within the communication path between the two (e.g., software operating on a network hub). Typically, one (first) software component is utilized, although some embodiments may employ software components on both ends of the communication (e.g., using both software component 520 and/or 560 to intercept the commands generated by peripheral device 510.

Figure 6:
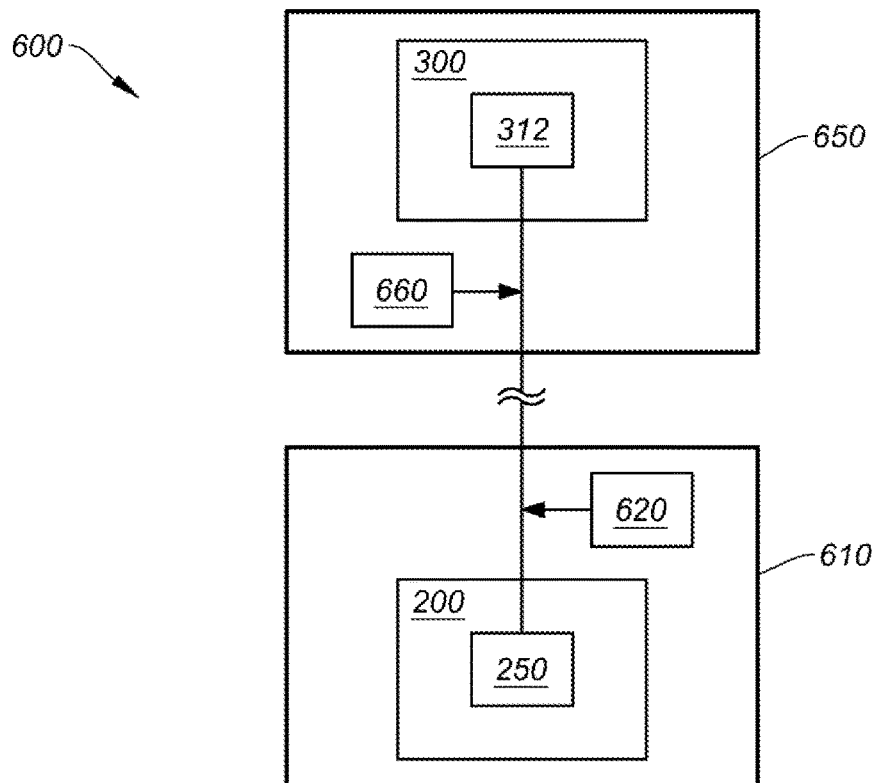
FIG. 6 shows a simplified block diagram of a system for intercepting a command from a peripheral device in a less invasive manner, according to certain embodiments.

FIG. 6 shows a simplified block diagram of a system 600 for intercepting a command from a peripheral device in a less invasive manner, according to certain embodiments. A peripheral device 610 (e.g., keyboard 110) is communicatively coupled to a host computing device 650 (e.g., host computer 150). Peripheral device 610 can include a system 200 with a communication system (module) 250 (as shown and described above with respect to FIG. 2) and a (first) software component 520 configured to access any command generated by peripheral device 510. Host computing device 650 (the command destination) can include a system 300 with a communication interface 312, as shown and described above with respect to FIG. 3, and a (alternative first) software component 660 configured to access any commands received from peripheral device 610. Communication interface 312 and communication system 312 can coordinate communication between peripheral device 610 and host computing device 650 using any suitable wireless or wired communication protocol. System 600 may operate similar to system 500 as described above, but for the nature of how commands are accessed. Software components 620 and/or 660 may access commands from peripheral device 610 without interfering with the communication between peripheral device 610 and host computing device 650. That is, commands can be sampled, read, accessed, or the like in a non-invasive manner to perform the operations steps of method 400, but without halting the submission of the command.

In some embodiments, the generation and submission of commands (e.g., HID commands) from peripheral device (e.g., keyboard 110) to host computer device (e.g., desktop computer 150), and the generation of a corresponding light output schema may be performed in a manner that is transparent from the user perspective. For instance, the interception, generation of a lighting output schema, and sending of the command to the intended destination may be performed in milliseconds such that the command is still performed in a time frame that can be undetectable by a user. In some cases, commands that are common across multiple software programs, operating systems, etc., with a same or similar function may be used so that a similar lighting output schema can be used across different software packages.

In some cases, the lighting output schema can be modified depending on a current output schema operating on the target device (e.g., the one or more devices that the lighting output schema is intended to control). For instance, different colors, brightness, patterns, etc., of the lighting output schema may depend, at least in part, on the current output schema and may be configured to match aspects (e.g., a color/pattern theme) of the current output schema (e.g., operating system color scheme, current application (e.g., video game) color scheme, etc.). In such cases, it is preferable that the lighting output schema still be clearly indicative of the function to the user (e.g., a volume up function should still be clearly conveyed by the modified lighting output schema).

In certain embodiments, the first software component may need to request and retrieve information from the host computing system pertaining to a current level of a particular function. For example, a lighting output schema may activate a number of visual output elements in a manner that visually reflects the current volume level of an audio system (e.g., represented as a bar that progresses along a row of LED enabled keys on a keyboard, as a speed of a light pulse that traverses a side of the LED-laden keyboard or other peripheral device). The command originating from the peripheral device, however, may simply indicate a volume increase or decrease, with no indicating of the present volume. In such cases, requesting and retrieving the current volume level will ensure that the representational lighting output schema can take into account the current volume level accurately reflect the volume as it is increased and decreased from the peripheral device.

In further embodiments, lighting around certain keys could be changed to be indicative of their current function using aspects of FIGS. 4-5. For example, a user could press an audio select button on a keyboard (peripheral device) and a row of keys could temporarily change color and function to adjust the volume of the source. This could be performed in conjunction with what is displayed on a monitor (display). For instance, color coding of keys on a keyboard could correspond with functionality displayed on the screen, as would be appreciated by one of ordinary skill in the art with the benefit of this disclosure. In some aspects, each active effect (e.g., lighting output schema) may be assigned a priority. Priority may be assigned based on the type of effect itself (e.g., some lighting output schemas may be designated as higher priority than other effects), or based on the latest effect in the queue (e.g., the most recent determined lighting output schema). In any case, the higher priority effect may be executed. In some cases, multiple effects may be played at the same time. For example, a user may mute a volume for a period of time, and then indicate a volume up command. In such cases, some embodiments may play a first effect indicating a transition from mute to unmute (e.g., an expanding light pulse effect played over multiple LEDs) and a sequential lighting pattern indicating an upward motion to indicate a volume up command (see, e.g., FIG. 11). In such cases, the volume can be obtained through an API provided by the host computing device's OS.

To expand on some of the concepts above, the interception may be used to provide a new medium to perform the same type of input. In some embodiments, an input device can use lighting effects to indicate, to a user, that a physical button's function of the input device has been temporarily remapped to perform a different function than what is indicated by text on the physical button. For example, the software component can, in response to receiving a command from the input device, enter a temporary remapping mode. While in the temporary remapping mode, the software component can send command(s) to the input device to illuminate key(s) indicating a function other than their respective normal function. While physical button(s) are illuminated in this manner, the software component can, in response to receiving normal commands (indicated by test on the physical button) from the illuminated key(s), intercept the commands and remap the normal commands to respective different commands. The software component may interact with a GUI to display the new functions of the illuminated key(s) to the user. Key(s) illuminated in this manner can be used in conjunction with any of the illumination techniques disclosed herein. One example use of this temporary remapping mode can be to enable control of a digital-to-audio converter (DAC) integrated into the keyboard for outputting analog audio to a user.

In some cases, multi-modality may be applied to enhance the way a user interacts with the intercepted type of control. For example, if a volume control (e.g., a button) on a keyboard does not have a volume wheel, a user may have to repeatedly press the button until the desired volume is reached, which can be cumbersome. Using embodiments described herein, pressing the volume (e.g., and holding for a few seconds) may cause the keyboard lighting to enter a "volume mode" where, for instance, the number "6" may quickly apply a 60% volume, a "4" may apply a 40% volume, and the like. In some aspects, cross-device multi-modality may be applied where the keyboard volume control may be a coarse setting, and a scroll wheel on a mouse (or gesture on touch sensitive interface, etc.) may fine tune the volume by smaller increments. Using multi-modality to change or remap the modality to different types of sensors, as described above, can help to improve accessibility to accommodate limited capabilities of certain users, as would be appreciated by one of ordinary skill in the art with the benefit of this disclosure.

In certain embodiments, the keyboard volume control may not be hooked into volume events and may communicate directly to a DAC configured to trigger a lighting change for a short period of time. That timeout can be renewed each time a related action is performed. In some embodiments, events (e.g., lighting output schemas) may be temporarily applied for a particular period of time, a direct action by a user (e.g., a toggle function), or other action. With the use of a DAC, the system does not need to be aware that a change of volume has been requested since the DAC may be configured to manage it alone. In such cases, it may appear to a user that they are interacting with the host computing device, but said interaction may all occur within the peripheral device itself. In some implementations, the DAC can be hosted within a first peripheral device X, and a second peripheral device Y may be aware that X has a DAC. The second peripheral device Y can then bypass the OS and send its commands directly to X, as would be appreciated by one of ordinary skill in the art with the benefit of this disclosure.

In certain embodiments, end software may not be aware of a multi-modality mode because the command may be intercepted before the end software can receive it.

Communication between the sensor that initiated the command and the sensor(s) that, through lighting for example, is remapped to the function may happen between the peripheral devices as noted above. However, some embodiments may employ software on the host computing device to help peripheral devices learn the capabilities of other peripheral devices connected to the same host computing device.

In some implementations, the software operating on the host computing device may broadcast to some or all connected peripheral devices that the instantiated function (e.g., volume control command) has been triggered. Each device that can then perform the lighting output schema using their own modality (e.g., a particular implementation of the lighting output schema). At this juncture, the software on the host computing device may not play a role other than converting commands a peripheral device to actual volume inputs (the initial command).

In some aspects, as noted above, interception may stop the command and replace it, or read the command and generate a lighting output schema without interfering with the initial command. For instance, in some embodiments the software residing on the host computing device may receive a HID code, but either the peripheral device sending the code may have already converted the HID code to a new code (e.g., with a lighting output schema), or the software replaces each HID report received with an appropriately remapped command, as further described above, and as would be appreciated by one of ordinary skill in the art with the benefit of this disclosure.

Modifying a Lighting Output Schema Based on a Position of an Object on a Peripheral Device Lighting output schemas, as described herein, can be designed to control visual output elements across any number of peripheral and/or host computing devices to create a rich and engaging array of light patterns, sequences, colors, and the like, that can markedly enhance the user experience (UX) in a computing system environment (see, e.g., FIG. 1). In some cases, however, the some or all of the visual output elements may be obscured from the view of the user. For example, lighting output schemas that light visual output elements (e.g., LEDs) on a keyboard or computer mouse may be obscured by the user's hand. In some instances, the lighting output schema may be particularly important to the user. For example, a lighting output schema may light certain LEDs on a keyboard that indicate when certain character abilities in a competitive gaming session are available. In such cases, it may be advantageous to move the lighting output schema to another location to ensure that it can be viewed by the user. The lighting output schema (e.g., a configuration of a number of visual output elements) may simply be moved and reproduced in substantially the same way. In some cases, the lighting output schema may be resized to accommodate available visual output elements. In further embodiments, the lighting output schema may be re-dimensioned when, for example, the same configuration of visual output elements cannot be reproduced elsewhere, a different representation of visual output elements are preferred on a different location of the peripheral device, or the like. In some cases, it may be advantageous to present the lighting output schema on a different device. Typically, in order to effectively relocate and/or modify a lighting output schema to minimize and/or reduce the obstruction, the extent of the obstruction is characterized to determine how far and in what manner the output needs to be modified, as further described below at least with respect to FIGS. 7-12.

Figure 7A:
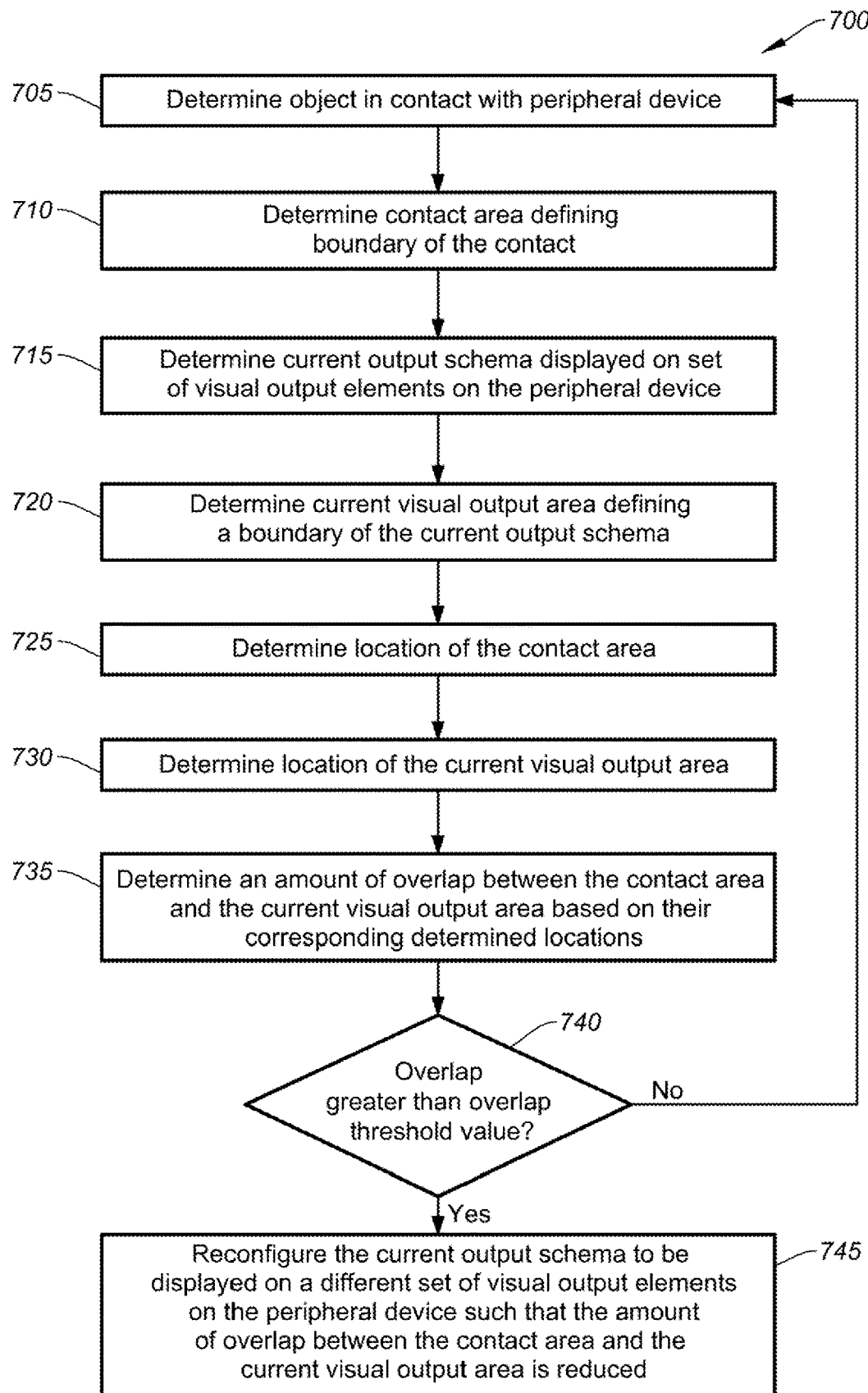
FIG. 7A is a simplified flow chart showing aspects of a method for reconfiguring an output schema to be displayed on a different set of visual output elements, according to certain embodiments.

FIG. 7A is a simplified flow chart showing aspects of a method 700 for reconfiguring an output schema to be displayed on a different set of visual output elements, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by a peripheral device (e.g., processor(s) 210 of keyboard 110), a host computing device (e.g., processors 302 of desktop 150), a combination thereof, as would be appreciated by one of ordinary skill in the art with the benefit of this disclosure. By way of a non-limiting example, a keyboard is used in the description that follows.

At operation 705, method 700 can include detecting an object in contact with a peripheral device, according to certain embodiments. Typically, in the case of a keyboard or computer mouse, the object can be a user's hand (e.g., typing/resting on the keyboard, controlling the computer mouse) although other objects may be in contact with the peripheral device (e.g., papers, loose clothing, or other inanimate objects). The detecting can be performed by one or more sensors including at least one of a capacitive sensor array, a resistive sensor array, an infra-red (IR) sensor array, an image sensor array, or the like. Capacitive and resistive sensor array may detect a physical touching of the object on the peripheral device (e.g., keyboard keys with touch sensitive surface, touch pads, etc.). IR and image sensors may capture images (e.g., from the peripheral device or directed to the peripheral device) to determine if an object appears to be in contact with or is obscuring at least a portion of the peripheral device. In some embodiments, touch or contact detection may be performed by input detection module 250 and/or processor(s) 210 of system 200.

In some embodiments, more sophisticated types of image processing may be used to detect when an object comes in contact with a peripheral device (e.g., via webcam, security camera communicatively coupled to the host computing device, etc.). A single image or multiple images may be used and accuracy can vary accordingly. Typically, methods for object detection using image processing generally fall into either machine learning-based approaches or deep learning-based approaches. For machine learning approaches, features may first be defined using one of the approaches listed below followed by a technique such as support vector machine (SVM) to do a classification. Deep learning techniques are typically able to do end-to-end object detection without specifically defining features, and are typically based on convolutional neural networks (CNN). Some machine learning approaches can include: Viola-Jones object detection framework based on Haar features, Scale-invariant feature transform (SIFT), Histogram of oriented gradients (HOG) features, or the like. Some deep learning approaches may include Region Proposals (R-CNN, Fast R-CNN, Faster R-CNN), single shot multi-box detector (SSD), you only look once (YOLO), single-shot refinement neural network for object detection (RefineDet), or the like, as would be appreciated by one of ordinary skill in the art with the benefit of this disclosure.

In some embodiments, objects may be determined to be in contact with a peripheral device based on data received from touch sensitive arrays, surfaces, etc. For instance, a keyboard, computer mouse, or other suitable input device may include elements (e.g., keys, buttons, etc.) with touch sensitive surfaces, touch sensitive layers, or the like, or may incorporate one or more image sensors for touch detection or hover detection (e.g., when a user's hands are positioned above, but not touching the surface of the peripheral device, as shown and described in greater detail in U.S. Pat. No. 9,612,664, which is herein incorporated by reference in its entirety for all purposes.

Alternatively or additionally, the object may be detected to be in proximity with the one or more peripheral devices such that the object is located in a position indicative of light generated by one or more visual output elements of the one or more peripheral devices being obfuscated from a user of the one or more peripheral devices. In other words, the object (e.g., a user's hand) is likely to be blocking light generated by one or more of the visual output elements from the user's view.

At operation 710, method 700 can include determining a contact area defining an outer boundary of the detected contact, according to certain embodiments. The contact area may correspond to the area obstructing a user's view. In the keyboard example, the contact area may correspond to the area where a user's hands and wrists cover the keyboard and block the user's line of sight.

At operation 715, method 700 can include determining a current output schema displayed on a set of visual output elements on the peripheral device, according to certain embodiments. The current output schema may be a lighting output schema causing a number of visual output element (e.g., LEDs) to activate in a particular manner. For example, the current output schema may cause a number of visual output elements to flash, change color, change brightness, or other effect in a particular sequence or pattern (see, e.g., the lighted keys in an upwards arrow configuration in FIG. 8).

At operation 720, method 700 can include determining a current visual output area defining an outer boundary of the current output schema, according to certain embodiments.

At operation 725, method 700 can include determining a location of the contact area, according to certain embodiments. In some embodiments, determining the location of the contact area may occur at operation 720.

At operation 730, method 700 can include determining a location of the current visual output area, according to certain embodiments. In some aspects, operation 750 may be performed at operation 740.

At operation 735, method 700 can include determining an amount of overlap between the contact area and the current visual output area based on their corresponding determined locations, according to certain embodiments.

At operation 740, in response to the amount of overlap being greater than an overlap threshold value, method 700 can include reconfiguring the current output schema to be displayed on a different set of visual output elements on the peripheral device such that the amount of overlap between the contact area and the current visual output area is reduced (operation 745), according to certain embodiments. In other words, the current output schema (e.g., sequential lighting pattern) can be moved to a less-obstructed location (a new group of visual output elements) so that it can be better viewed by a user. Any suitable overlap threshold value can be used (e.g., 10%, 25%, 50%, 75% overlap). In cases where the amount of overlap is less than the overlap threshold value, no action may be taken or method 700 may return to operation 705 (or 710) to re-determine the current status of the object and corresponding contact area, which may be performed continuously or periodically.

In order to move the current output schema to a new location, the system may need to determine what visual output elements are currently available and where they are located. For instance, moving the current output schema to a new location and utilizing the same number of visual output element in substantially the same configuration (e.g., to look approximately the same) may require that the new location have the requisite number of available visual output elements available. To make this determination, method 700 may further include determining a total visual output area defining an area and location of available visual output elements on the peripheral device, and determining how far the current output schema can be moved within the total visual output area to reduce the overlap based on the current visual output area and the contact area. In such cases, reconfiguring the current output schema may be further based on how far the current output schema can be moved. For instance, if many visual output elements are available over a relatively large area, such as with a keyboard with LEDs on each key, it may be possible to move the current output schema to a completely unobstructed location. However, in some instances, the current output schema may have a large visual output area and/or there may not be a completely unobstructed location on the peripheral device that has enough visual output elements to generate the current output schema. In such cases, the current output schema may be moved to a location that is obstructed, but to a lesser extent.

Figure 9:
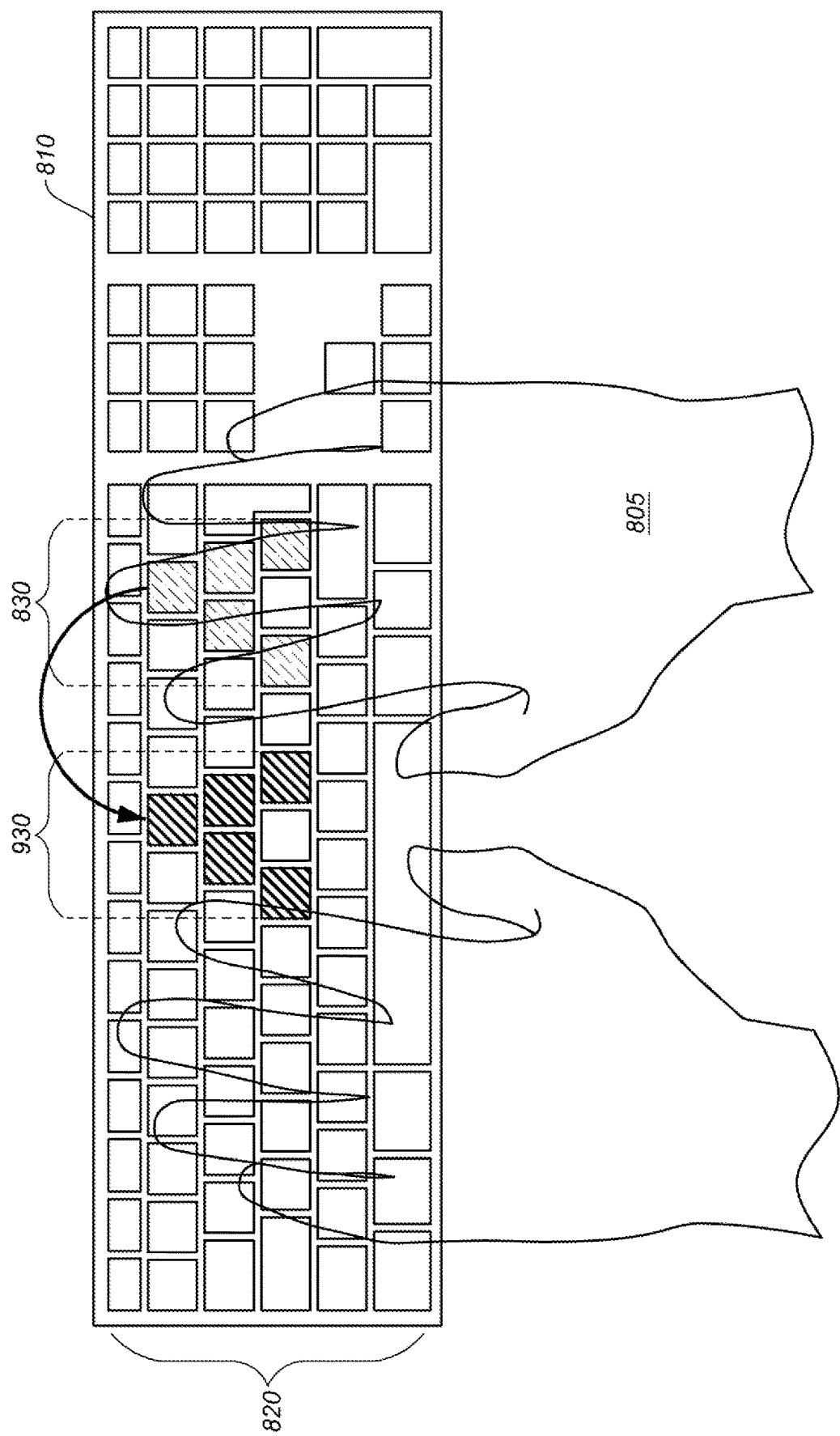
FIG. 9 shows an example of reconfiguring a lighting output schema via repositioning, according to certain embodiments.
Figure 10:
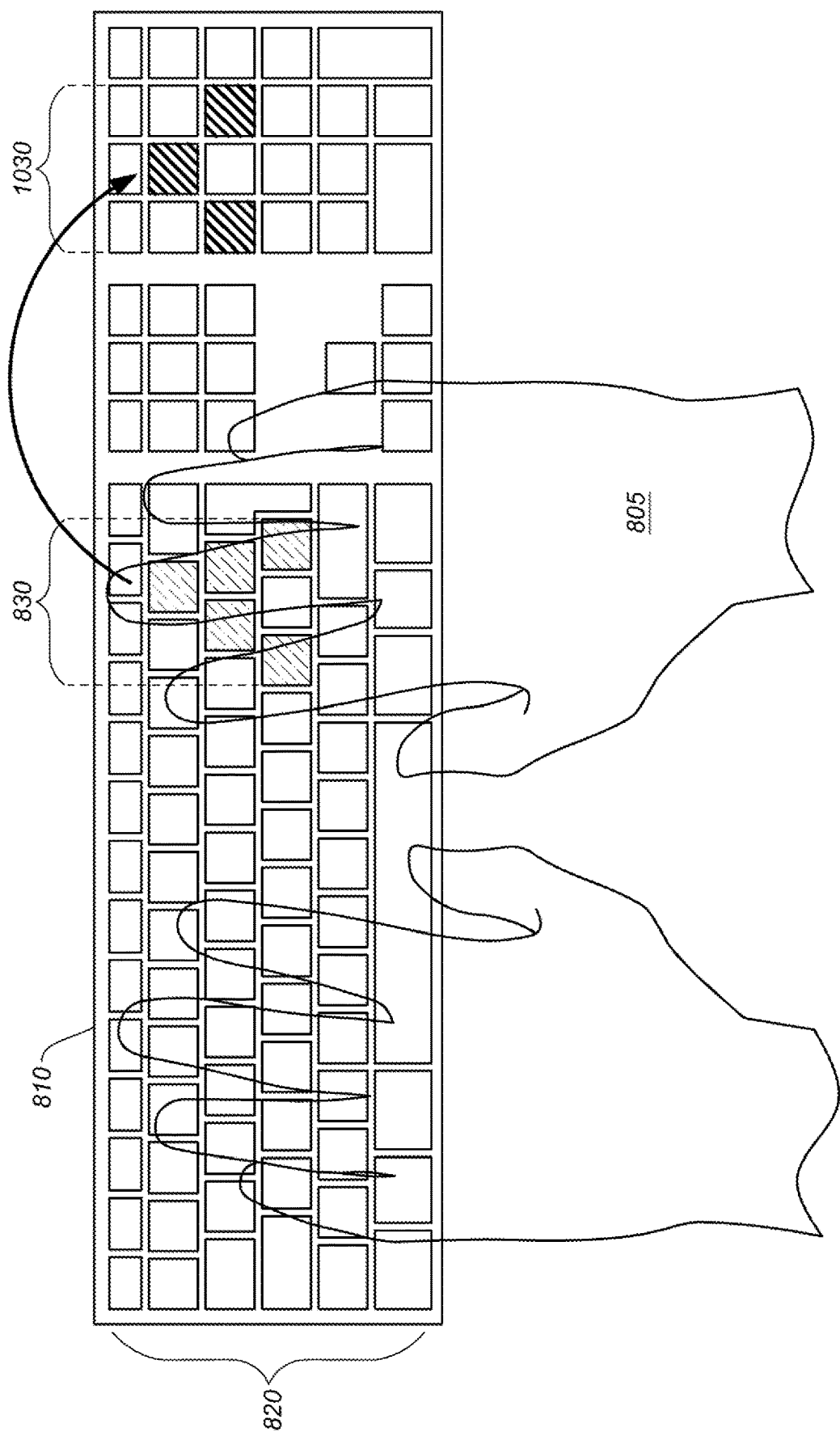
FIG. 10 shows an example of reconfiguring a lighting output schema via resizing, according to certain embodiments.
Figure 11:
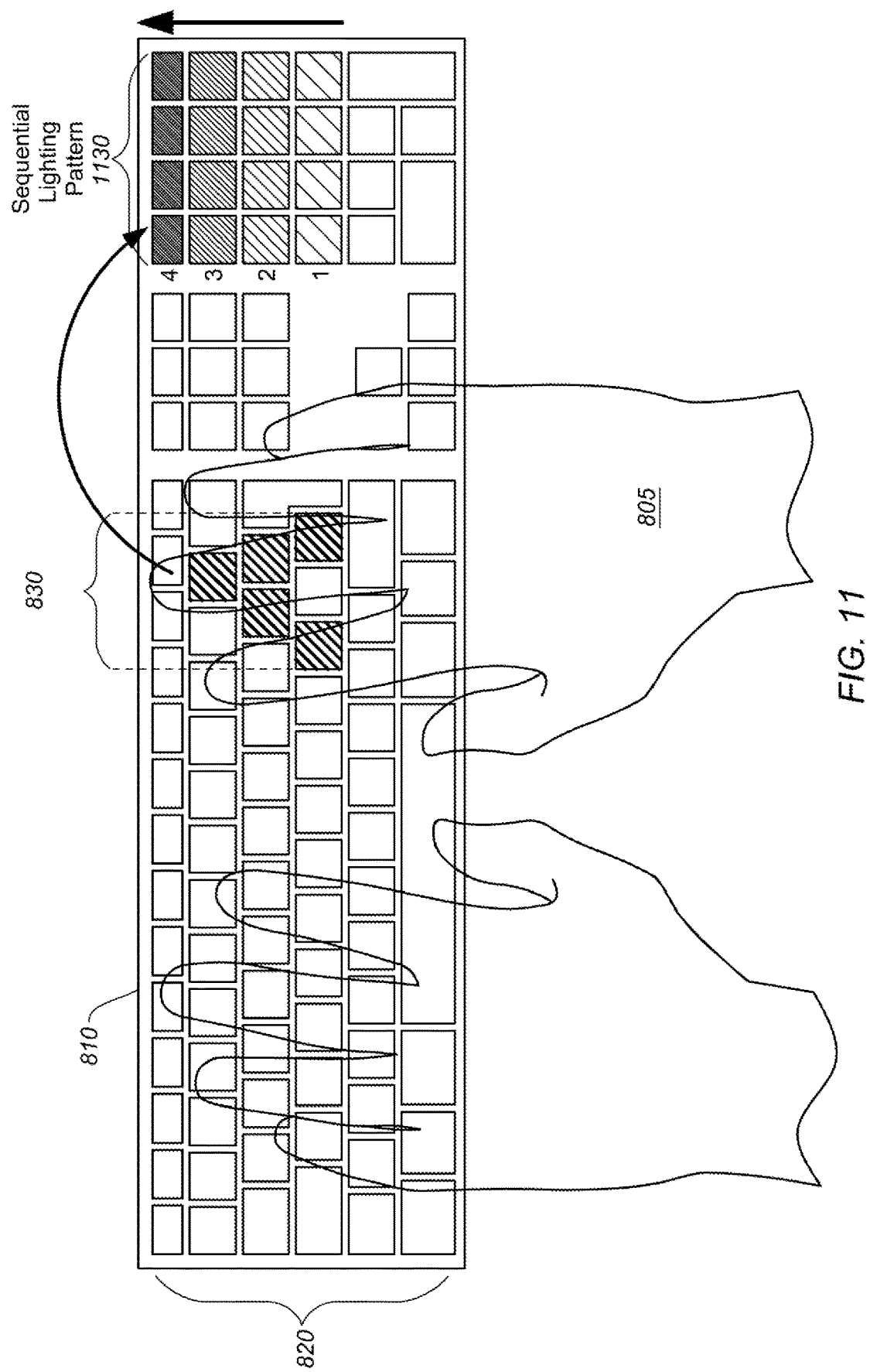
FIG. 11 shows an example of reconfiguring a lighting output schema via re-dimensioning, according to certain embodiments.

Reconfiguring the current output schema may mean repositioning it, which can correspond to moving the current output schema to a new set of visual output elements (e.g., partially obstructed or not) and maintaining the general shape, size, and presentation. This may require that there are enough available visual output elements to display the current output schema. One example of repositioning is shown in FIG. 9. In some embodiments, reconfiguring the current output schema may involve resizing the current visual output area. That is, the general shape may be approximately maintained but enlarged or reduced. One example of resizing is shown in FIG. 10. In further embodiments, reconfiguring the current output schema may include re-dimensioning the current visual output area. That is, the current output schema may be not only resized, but the shape may be changed completely. An example of re-dimensioning is shown in FIG. 11. The type of reconfiguration may depend on the number of available visual output elements, the location of the available visual output elements, user preferences, or the like. For example, the alphanumeric portion of a keyboard may have 40+ available LED-enabled keys. Some output schemas that cover a significant percentage of the alphanumeric portion may not easily fit anywhere else on the keyboard (e.g., the number pad, arrow keys, etc.), thus likely prompting a resize or re-dimensioning due to the fewer number of visual output elements. One of ordinary skill in the art with the benefit of this disclosure would appreciate the many modifications, variations, and alternative embodiments thereof.

It should be appreciated that the specific steps illustrated in FIG. 7A provide a particular method 700 for reconfiguring an output schema to be displayed on a different set of visual output elements, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 7B:
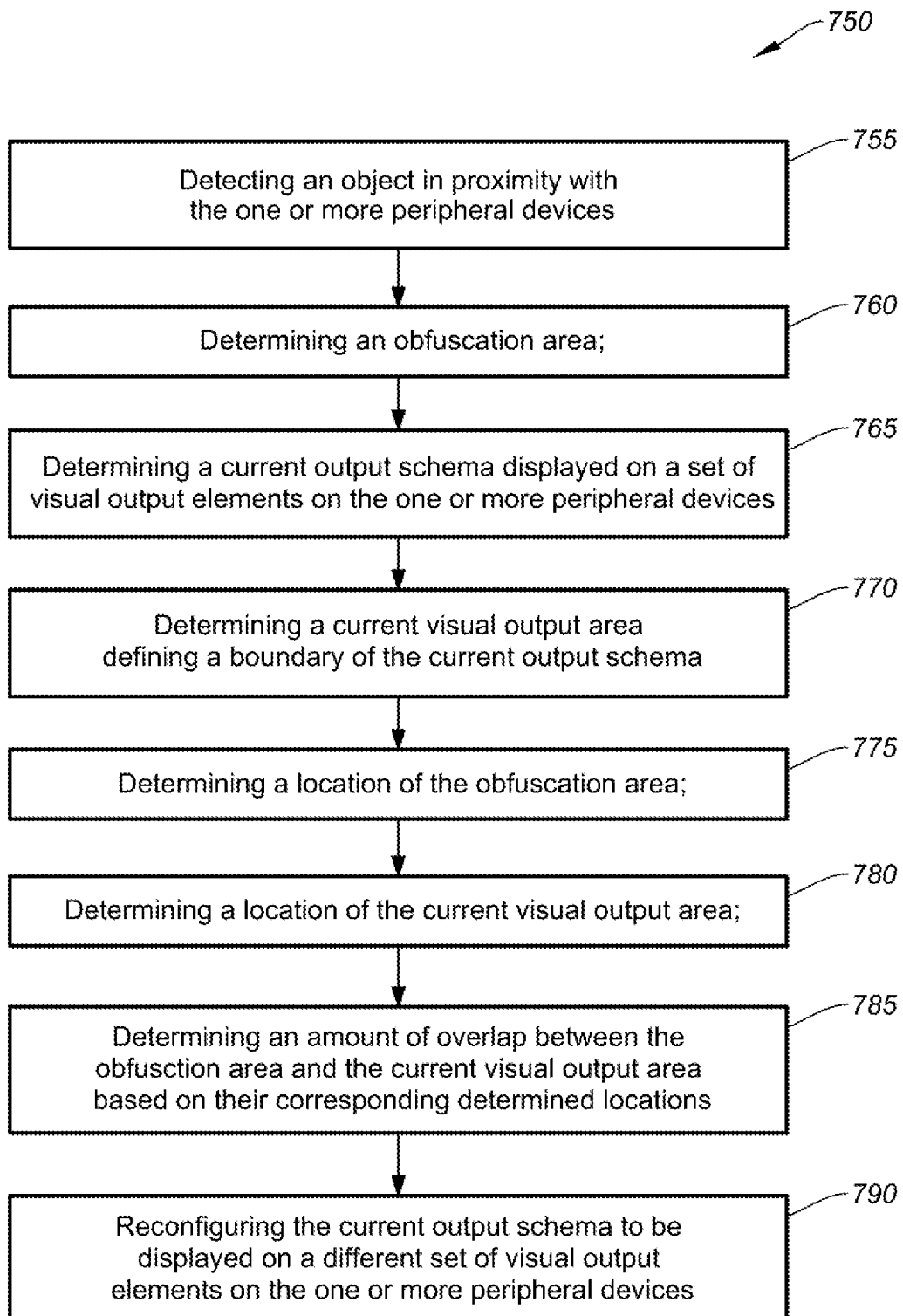
FIG. 7B is a simplified flow chart showing aspects of another method for reconfiguring an output schema to be displayed on a different set of visual output elements, according to certain embodiments.

FIG. 7B is a simplified flow chart showing aspects of another method 750 for reconfiguring an output schema to be displayed on a different set of visual output elements, according to certain embodiments. Method 750 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 750 can be performed by a peripheral device (e.g., processor(s) 210 of keyboard 110), a host computing device (e.g., processors 302 of desktop 150), a combination thereof, as would be appreciated by one of ordinary skill in the art with the benefit of this disclosure.

At operation 755, method 750 can include detecting an object in in proximity with one or more peripheral devices such that the object is located in a position indicative of light generated by one or more visual output elements of the one or more peripheral devices being obfuscated from a user of the one or more peripheral devices, according to certain embodiments. In some cases, detecting the object can be performed by one or more sensors including at least one of a capacitive sensor array, resistive sensor array, infra-red sensor array, image sensor array, or other suitable proximity sensor system. The visual output elements may include one or more light emitting diodes (LEDs) or one or more liquid crystal displays (LCDs). The set of visual output elements can be physically located on a first peripheral device of the one or more peripheral devices and the different set of visual output elements can include visual output elements on a second peripheral device of the one or more peripheral devices. Any number of peripheral devices and corresponding visual output elements may be used.

At operation 760, method 750 can include determining an obfuscation area defining a boundary of an area of the one or more peripheral devices being obfuscated, according to certain embodiments.

At operation 765, method 750 can include determining a current output schema displayed on a set of visual output elements on the one or more peripheral devices, wherein the set of visual output elements includes the one or more visual output elements, according to certain embodiments.

At operation 770, method 750 can include determining a current visual output area defining a boundary of the current output schema, according to certain embodiments.

At operation 775, method 750 can include determining a location of the obfuscation area, according to certain embodiments.

At operation 780, method 750 can include determining a location of the current visual output area, according to certain embodiments.

At operation 785, method 750 can include determining an amount of overlap between the obfuscation area and the current visual output area based on their corresponding determined locations, according to certain embodiments.

At operation 790, in response to the amount of overlap being greater than an overlap threshold value, method 750 can include reconfiguring the current output schema to be displayed on a different set of visual output elements on the one or more peripheral devices such that the amount of overlap between the contact area and the current visual output area is reduced, according to certain embodiments. In some implementations, reconfiguring the current output schema can include any of repositioning the current visual output area, resizing the current visual output area, re-dimensioning the current visual output area, or reducing the number of visual output elements used in the current output schema thereby reducing a total power consumption of the visual output elements on the peripheral device. In some cases, reconfiguring of the current output schema can be done continuously or intermittently in real-time.

It should be appreciated that the specific steps illustrated in FIG. 7B provide a particular method 750 for reconfiguring an output schema to be displayed on a different set of visual output elements, according to certain embodiments. Other sequences of steps may also be performed according to alternative embodiments. Furthermore, additional steps may be added or removed depending on the particular applications. For example, method 450 may further include determining a total visual output area defining an area and location of available visual output elements on the one or more peripheral devices and determining how far the current output schema can be moved within the total visual output area to reduce the overlap based on the current visual output area and the contact area, where reconfiguring the current output schema is further based on how far the current output schema can be moved, according to certain embodiments. Any combination of changes can be used and one of ordinary skill in the art with the benefit of this disclosure would understand the many variations, modifications, and alternative embodiments thereof.

Figure 8:
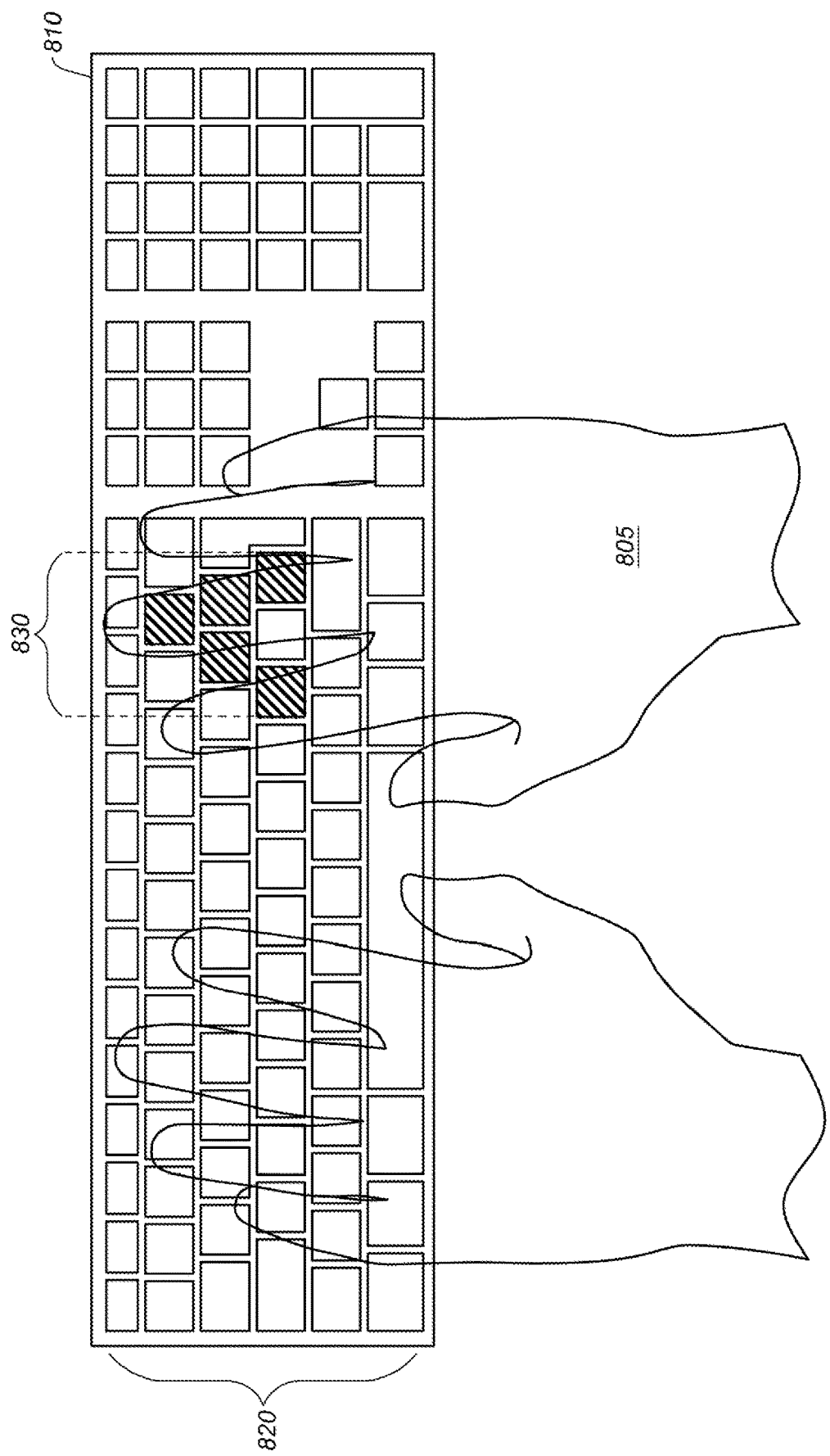
FIG. 8 shows an example of an obstructed lighting output schema displayed on a number of visual output elements of a peripheral device, according to certain embodiments.

FIG. 8 shows an example of an obstructed lighting output schema displayed on a number of visual output elements of a peripheral device 810, according to certain embodiments. A user 805 is interfacing with the peripheral device (keyboard) 810 having an array of keys 820. Each key may include a visual output element (e.g., LED). A number of keys and corresponding LEDs 830 are activated in an upward facing arrow pattern. This lighting output schema may be indicative of a "volume up" command generated by the keyboard or other peripheral device (e.g., a computer mouse). The user's hands 805 are obscuring a number of keys from view, including most of the activated LEDs. In order for the user to see the lighting output schema, the corresponding pattern can be moved to a new and preferably unobstructed location, as described above with respect to FIG. 7. The new location can depend on the number of available visual output elements; their location and whether they are also obstructed by the user's hands; the size, dimensions, and location of the obstruction (the contact area); the size, dimensions, and location of the current output schema; how conspicuous or more easily noticed certain areas of the peripheral device may be, or the like, as would be appreciated by one of ordinary skill in the art with the benefit of this disclosure. Although a keyboard is depicted as the peripheral device in FIG. 8, other peripheral devices may have lighting output schemas reconfigured in a similar manner. Typically, keyboards, computer mice, remote controls, gaming controllers, presenter devices, and other devices that are either hand held or interfaced by a user's hand may be subject to similar issues with obstruction.

FIG. 9 shows an example of reconfiguring a lighting output schema via repositioning, according to certain embodiments. A user 805 is interfacing with the peripheral device (keyboard) 810 having an array of keys 820. Each key may include a visual output element (e.g., LED). A number of keys and corresponding LEDs 830 are activated in an upwards facing arrow pattern that corresponds to a "volume up" function. The user's hands 805 are obscuring a number of keys from view, including most of the activated LEDs 830. In order for the user to see the lighting output schema, the corresponding pattern can be moved to a new and preferably unobstructed location, as shown with LEDs 930. Because of the relatively large number of unobstructed and available visual output elements on the keyboard, and the LEDs 930 are substantially configured in the same shape with the same number of LEDs. In some cases, there may slight spacing differences between keys that could result in minor differences (but substantially similar) in the overall shape of the lighting output pattern.

FIG. 10 shows an example of reconfiguring a lighting output schema via resizing, according to certain embodiments. Similar to FIGS. 8 and 9, user 805 is interfacing with peripheral device 810 having an array of keys 820 with corresponding LEDs. LEDs 830 are activated in an upwards facing arrow pattern that corresponds to a "volume up" function, which are obscured from view. In order for the user to see the lighting output schema, the corresponding pattern can be moved and resized, as shown with LEDs 1030. The lighting output schema is moved from the alphanumeric keys to the number pad (referred to as a "keypad"), which may be more easily seen and noticed by the user. In some embodiments, the lighting output schema (e.g., upwards facing arrow) may not be able to be reproduced as shown with LEDs 830 due to the limited number of visual output element in the keypad, so a resized upwards facing arrow is generated, as shown.

A variety of factors may be considered when determining where to place and/or resize an output lighting schema. For instance, if the software is aware of the peripheral device's functionality with a currently running application, e.g., a user is playing a game and the software knows that the input elements (e.g., keys) "A," "S," "D," and "W" are frequently used, the software may choose to display a corresponding output lighting schema at a location on the peripheral device (and/or another peripheral device) in an area that is not physically near those particular input elements. Note that references to the "software" typically refers to software operating on the host computing device, such as Logitech® Options® software, or other suitable program to control the various inventive concepts described herein. Alternatively or additionally, firmware operating on one or more peripheral devices may perform some or all of the actions. One of ordinary skill in the art with the benefit of this disclosure would appreciate the many modifications, variations, and alternative embodiments thereof.

In some aspects, if the software is aware of the physical location of the one or more peripheral devices, peripheral devices that are not in a user's area of vision may be deselected from usage. For instance, the software may be configured to actively track on the user's current usage of the peripheral devices and choose a peripheral device(s) to display a lighting output schema that is not being actively interacted with or has not been in use for a period of time. This may increase a likelihood that the user's hands are not obstructing the user's view of the chosen peripheral device. Any sensor data, be it visual (image) data, heat data, motion detection data, etc., provided by one or more peripheral devices could be used to determine locations of activity or obscuration in the manner presented herein.

In some implementations, certain regions of the peripheral devices may be defined for displaying lighting output schemas. Defined regions may help to ensure that the desired look (e.g., lights), sound, and feel (e.g. haptics) of the lighting output schema (and possibly sound and vibro-tactile feedback) is presented to the user in a an aesthetically pleasing manner. For instance, the software could rank the fitness of each defined region for displaying the lighting output schema based on their level of detected obscuration (current and/or historical levels) and/or how desirable their location is for the effect (light output schema) to be played. Other factors are possible, as would be appreciated by one of ordinary skill in the art with the benefit of this disclosure.

FIG. 11 shows an example of reconfiguring a lighting output schema via re-dimensioning, according to certain embodiments. Similar to FIGS. 8-10, user 805 is interfacing with peripheral device 810 having an array of keys 820 with corresponding LEDs. LEDs 830 are activated in an upwards facing arrow pattern that corresponds to a "volume up" function, which are obscured from view. In order for the user to see the lighting output schema, the corresponding pattern can be moved and re-dimensioned, as shown with LEDs 1130. The lighting output schema is moved from the upwards arrow shape to a sequential upwards pattern of rows that change colors and/or brightness. Re-dimensioning may be performed for any suitable purpose. For instance, it may not be possible to recreate the same shape of the lighting output pattern of LEDs 830 on the keypad, thus resizing and/or re-dimensioning may be an apt solution. In some cases, a groups of visual output elements on a peripheral device at a first location may better present certain lighting output schemas in a different manner when displayed at a second location (e.g., alphanumeric key region vs. number pad region). One of ordinary skill in the art with the benefit of this disclosure would appreciate the many modifications, variations, and alternative embodiments thereof.

Figure 12:
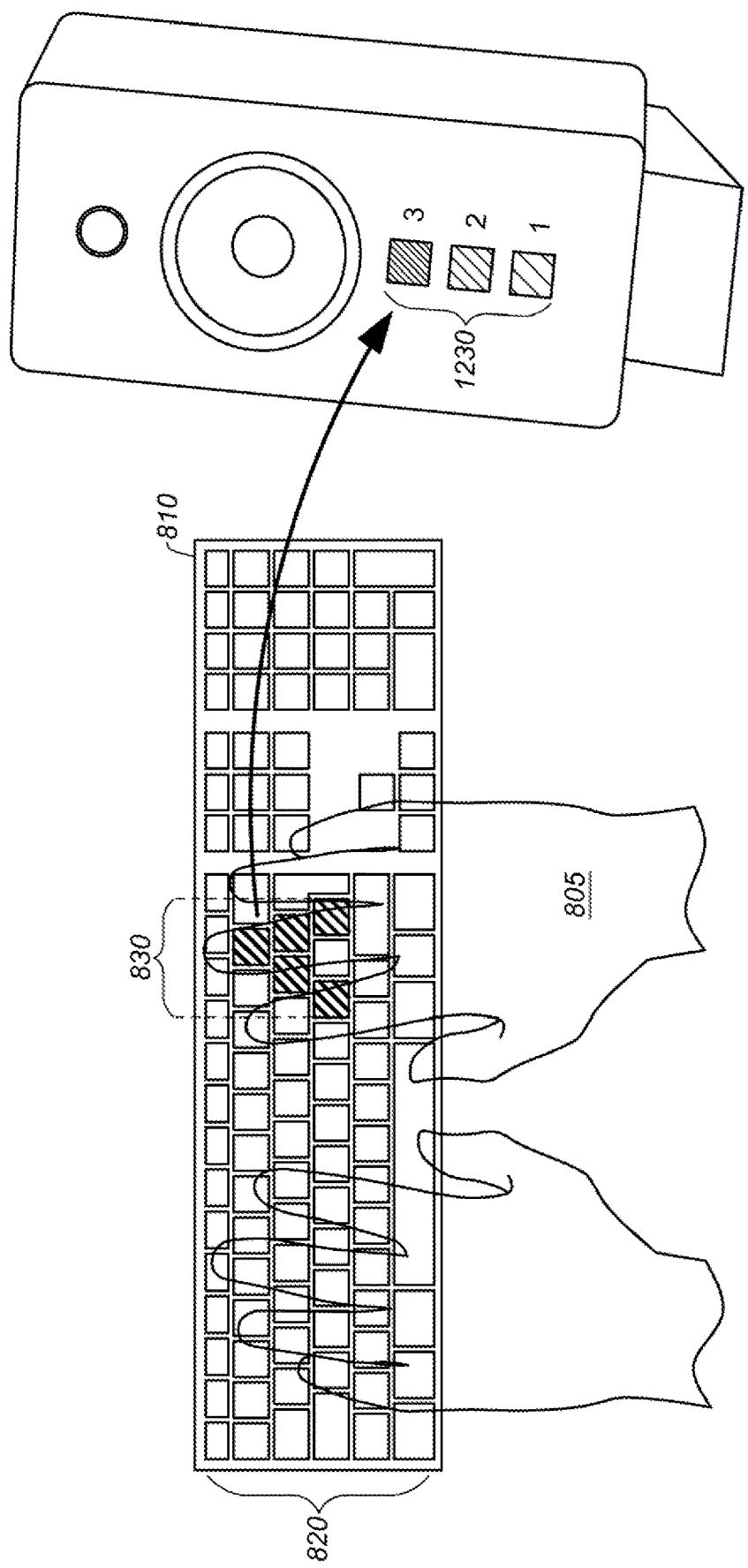
FIG. 12 shows an example of reconfiguring a lighting output schema via re-location on a different peripheral device, according to certain embodiments.

FIG. 12 shows an example of reconfiguring a lighting output schema via re-location on a different peripheral device, according to certain embodiments. Similar to FIGS. 8-11, user 805 is interfacing with peripheral device 810 having an array of keys 820 with corresponding LEDs. LEDs 830 are activated in an upwards facing arrow pattern that corresponds to a "volume up" function, which are obscured from view. In order for the user to see the lighting output schema, the corresponding pattern can be moved to a new peripheral device, as shown with LEDs 1230. The lighting output schema is moved from the upwards arrow shape to a sequential upwards pattern of LEDs that change colors and/or brightness. Re-location to a new peripheral device may be performed for any suitable purpose, as described above. For instance, other LEDs on the keyboard may be activated for other purposes, so to avoid confusing the user or interfering with a preferred color/lighting schema, the lighting output schema may be move effectively represented (e.g., may be more easily noticed by the user) on a different and preferably more noticeable location, such as the speakers or other peripheral device with an adequate number of programmable visual output elements.

In further embodiments, instead of reconfiguring the current output schema to a new location, obscured visual output elements may be simply shut off, thereby reducing a total power consumption of the visual output elements on the peripheral device.

In certain embodiments, a heat map of the keyboard (e.g., a visualization of a character distribution of texts on a keyboard; a log showing key press frequency over time) can be used to determine where the user's hands are or where they are typically arranged. The heat map can be used alone or in conjunction with the sensed location of the contact to perform the various concepts described above with respect to FIGS. 7-12.

In some embodiments, changing a lighting output schema may be performed manually or programmed by a user. For instance, a scroll wheel can be used to select a key or a group of keys (with corresponding LEDs). A second scroll wheel (or other suitable input element) can be used to change colors and/or effects. In such cases, pre-generated effects can be selected and an initial starting point can be physically selected by the user (e.g., a ripple effect). An editor can also be used to input lighting effects. One of ordinary skill in the art with the benefit of this disclosure would appreciate the many modifications, variations, and alternative embodiments thereof.

Modifying a Lighting Sequence Based on a Physical Distance Between Peripheral Devices Some embodiments may be directed to synchronizing a lighting output schema across multiple peripheral devices to create a visually appealing and uniform aesthetic effect, as described below with respect to FIG. 13. In some aspects, a timing of a lighting output schema that traverses multiple peripheral devices may depend on a physical distance between the peripheral devices. For example, a light-based wave effect configured to traverse across a plurality of peripheral devices (e.g., speakers, headset, keyboard, mouse, etc.) may be configured to take longer to traverse peripheral devices that are physically spaced farther apart than peripheral device that are spaced closer together, as described below with respect to FIGS. 15A-15B. In some implementations, the physical distance between the peripheral devices (and the host computing device) may be manually entered via a GUI (see, e.g., FIG. 14A), by RF communication such as time-of-flight (TOF) measurements (see, e.g., FIG. 14B), by image sensors (see, e.g., FIG. 14C), or other suitable method, as further described below. In some cases, lighting effects may be triggered based on a movement of peripheral devices relative to one another. For example, moving a computer mouse too close to the keyboard or an edge of a charging pad may cause corresponding side of a display to light up (e.g., like a degaussing effect with cathode ray tube televisions) to warn a user to skate their mouse back to a center portion of the mouse pad (see, e.g., FIG. 15). These examples and more are provided in the non-limiting embodiments that follow.

Figure 13:
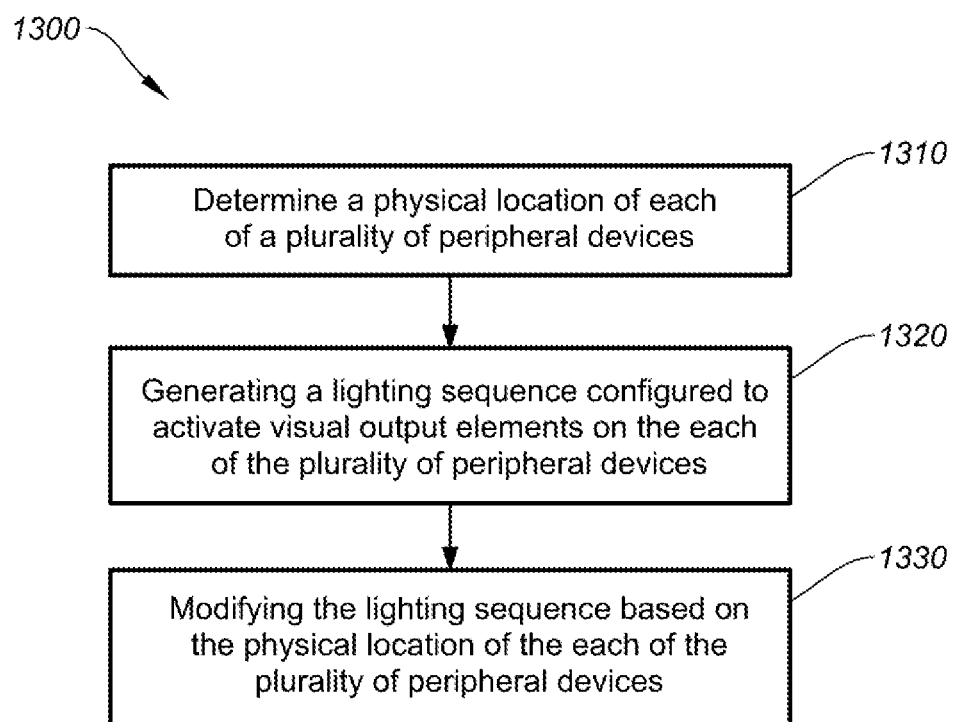
FIG. 13 is a simplified flow chart showing aspects of a method for synchronizing a lighting output schema across multiple peripheral devices based on their physical locations relative to one another, according to certain embodiments.

FIG. 13 is a simplified flow chart showing aspects of a method 1300 for synchronizing a lighting output schema across multiple peripheral devices based on their physical locations relative to one another, according to certain embodiments. Method 1300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 700 can be performed by a peripheral device (e.g., processor(s) 210 of keyboard 110 running corresponding firmware and/or software), a host computing device (e.g., processors 302 of desktop 150), a combination thereof, as would be appreciated by one of ordinary skill in the art with the benefit of this disclosure.

Figure 14A:
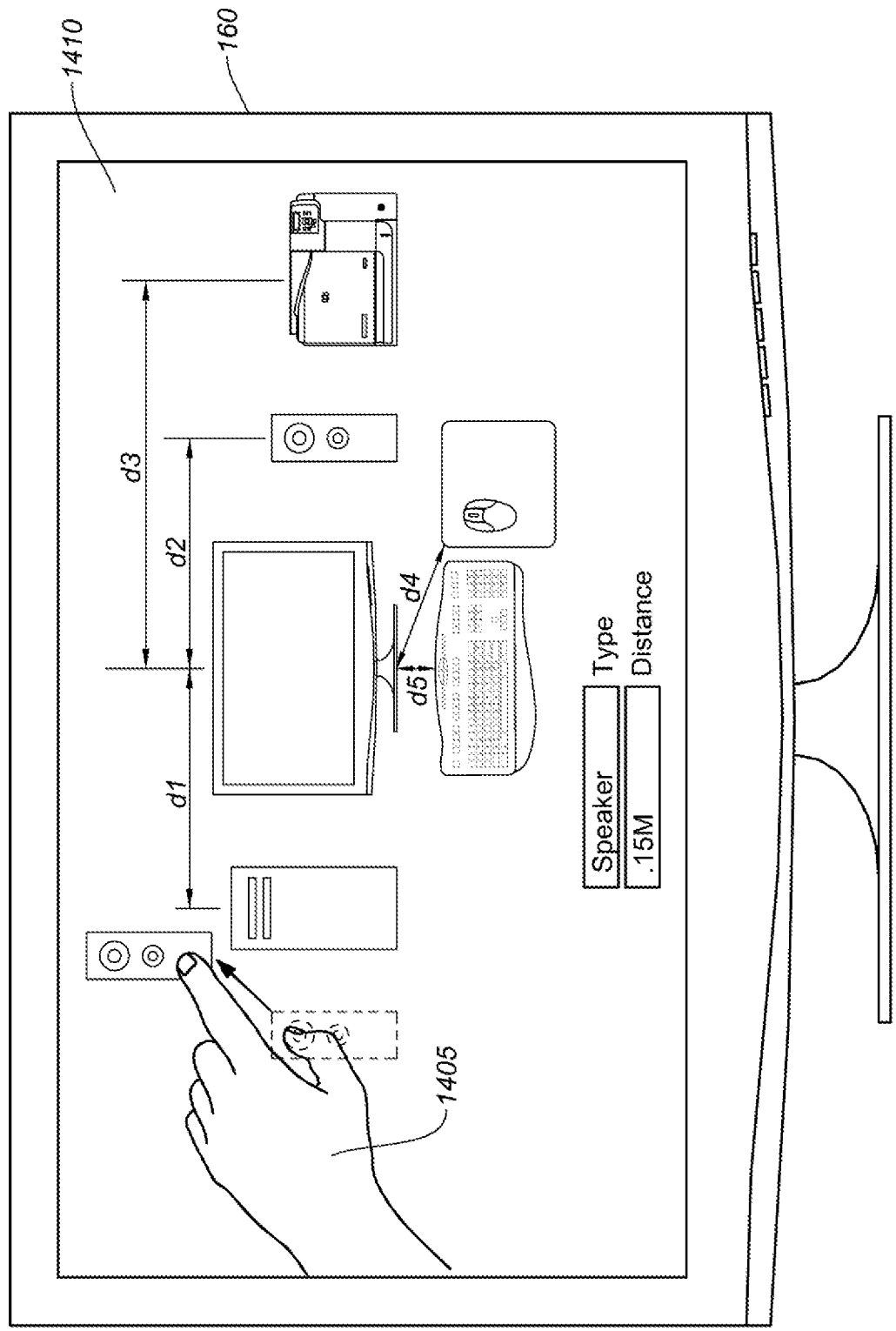
FIG. 14A shows a simplified example of a graphical user interface for manually entering a physical arrangement of devices (e.g., peripheral devices, host computing device(s)) in a system, according to certain embodiments.

At operation 1310, method 1300 can include determining a physical location of each of a plurality of peripheral devices communicatively coupled to a host computing device, according to certain embodiments. In some embodiments, determining a respective physical location of each of the plurality of peripheral devices can include receiving location data from a graphical user interface (GUI) configured to receive inputs from a user, where the location data including a physical location of each of the plurality of peripheral devices, as shown in FIG. 14A. Alternatively or additionally, determining a respective physical location of each of the plurality of peripheral devices can include receiving location data for each of the plurality of peripheral devices from the plurality of peripheral devices via radio frequency (RF), infra-red (IR), or acoustic communication protocols. For instance, a time-of-flight (TOF) measurement between devices can be used to determine location and/or relative distances between the various devices of the system (100).

In some embodiments, determining a respective physical location of each of the plurality of peripheral devices can alternatively or additionally include receiving image data from one or more image sensors, where the image data includes pixel data showing the physical location of each of the plurality of peripheral devices. The image data can include color data and intensity data for each of the visual output elements on the plurality of peripheral devices. In such cases, the method may further include (not shown in the flowchart) modifying the color output and intensity output of the visual output elements based on the color data and intensity data. Modifying the color output and intensity output includes at least one of: normalizing color output or intensity output of the visual output elements; increasing the intensity output of the visual output elements based on their physical location; modifying a color output or intensity output based on an ambient lighting; or the like.

At operation 1320, method 1300 can include generating a lighting sequence configured to activate visual output elements on the each of the plurality of peripheral devices, according to certain embodiments. The lighting sequence may include any suitable pattern, color scheme, or other aspect of modulating an output of the visual output elements (e.g., LEDs, LCDs, etc.). In some embodiments, the lighting sequence causes the visual output elements to activate in a time-based sequential pattern that traverses the plurality of peripheral devices. For instance, a lighting pattern may be configured to move from one end of a series of peripheral devices to the other end over a period of time (e.g., 1-3 seconds).

At operation 1330, method 1300 can include modifying a timing parameter of the lighting sequence based on the respective physical location of each of the plurality of peripheral devices, according to certain embodiments. In some embodiments, modifying the lighting sequence can include determining a distance between at least two of the plurality of peripheral devices and modifying the timing parameter of the sequential pattern based on the distance between the at least two of the plurality of peripheral devices. The timing parameter may include a total time that the lighting sequence to traverse the plurality of peripheral devices. Other timing parameters may include a time for the lighting sequence to remain at one or more particular peripheral devices or the individual visual output elements thereof. The lighting sequence may traverse the peripheral devices in any manner, such as right-to-left, left-to-right, up-to-down, down-to-up, traversal from a center position out to the peripheral in an omnidirectional or bidirectional manner or vice versa, or any suitable sequence using the visual output element and/or with other output elements including audio and haptic output elements. One of ordinary skill in the art with the benefit of this disclosure would appreciate the many modifications, variations, and alternative embodiments thereof.

It should be appreciated that the specific steps illustrated in FIG. 13 provide a particular method 1300 for synchronizing a lighting output schema across multiple peripheral devices based on their physical locations relative to one another, according to certain embodiments. Other sequences of steps may also be performed according to alternative embodiments. For example, method 1300 may further include receiving location data from a position sensor on a computer mouse (e.g., one of the plurality of peripheral devices) and modifying a lighting output schema for the computer mouse based on the location of the computer mouse relative to the other peripheral devices of the plurality of peripheral devices. In some cases, modifying a lighting output schema for the computer mouse may be further based on the location of the computer mouse relative to its position on a mouse pad. It should be noted that method 1300 may include other additional steps that may be added or removed depending on the particular applications. Any combination of changes can be used and one of ordinary skill in the art with the benefit of this disclosure would understand the many variations, modifications, and alternative embodiments thereof.

FIG. 14A shows a simplified example of a graphical user interface 1410 for manually entering a physical arrangement of devices (e.g., peripheral devices, host computing device(s)) in a system, according to certain embodiments. GUI 1410 is shown on display 160 and includes a digital representation of a physical arrangement of a user's system (e.g., system 100). A user 1405 may manually move the digital representations on the display to look like the real physical layout to inform the system of how the devices are arranged relative to one another. In some cases, the system may track both a device type (e.g., speaker, keyboard, etc.) and the distances relative to one another, as shown. Distances may include the lateral arrangement of devices along a first axis (e.g., an x-axis), a second axis orthogonal to the first axis (e.g., y-axis), and in some cases a third axis (e.g., a z-axis) orthogonal to the first and second axes. In some embodiments, the arrangement of devices may be automatically determined by the system by using TOF measurements and/or image data to measure distances (d) between devices. FIG. 14A shows a 2D representation (x and z axis) of a physical system layout, however 3D representations (e.g., x, y, and z axes—to add "depth") are possible.

In some embodiments, the GUI may also be used to control aspects of the lighting output schema to control how lighting patterns traverse across the multiple peripheral devices (e.g., on corresponding visual output elements) including timing, patterns, colors, brightness, modulations thereof, or the like.

A distance can be measured relative to a common point, multiple points, relative to one another (e.g., distances between peripheral devices), or the like. In some aspects, defined regions to display lighting output schemas for one or more of the peripheral devices may be shown in a GUI. The defined regions may be factory pre-set or programmed by a user. For instance, a user may define which output elements (e.g., LEDs) are to be used on each peripheral device and in what manner (e.g., preferred patterns, brightness, etc.). One of ordinary skill in the art with the benefit of this disclosure would appreciate the many modifications, variations, and alternative embodiments thereof.

Figure 14B:
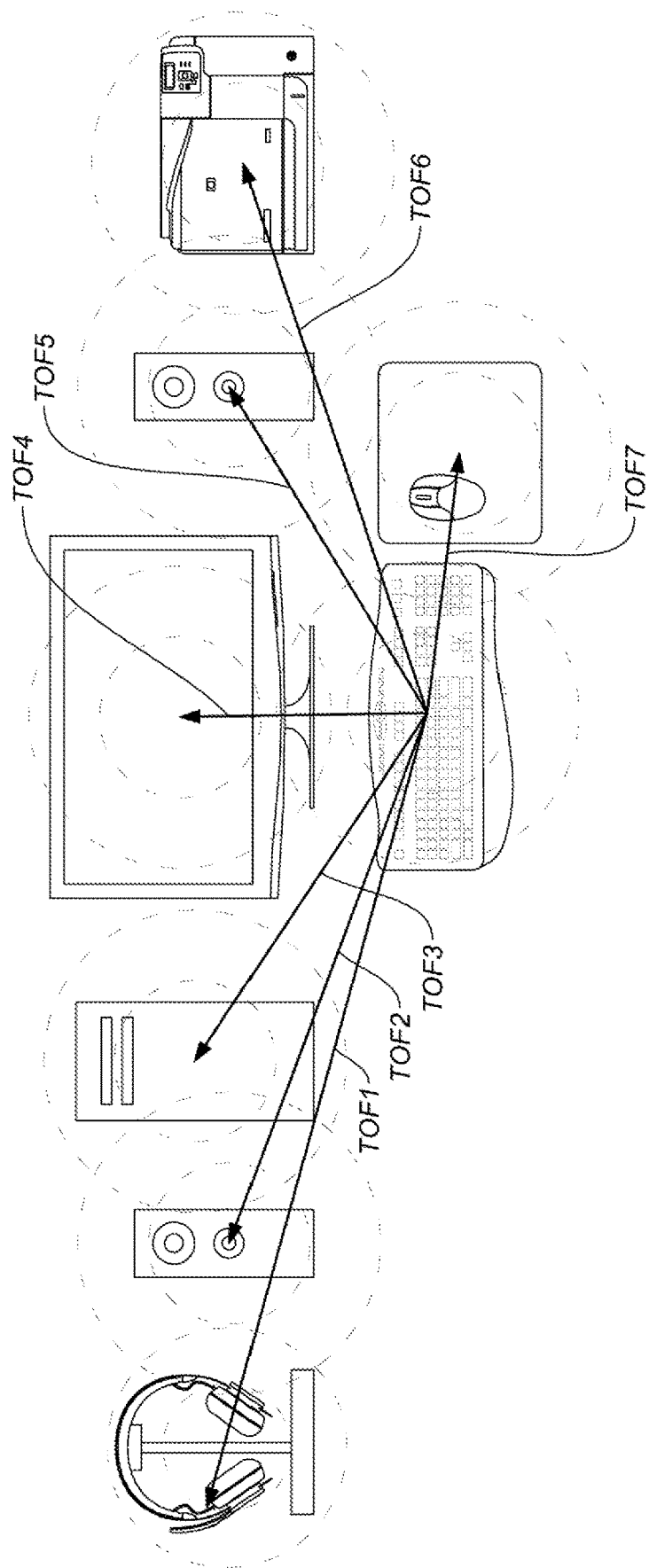
FIG. 14B shows a simplified example of how RF communication between devices may be used to determine a physical arrangement of devices in a system, according to certain embodiments.

FIG. 14B shows a simplified example of how RF communication between devices may be used to determine a physical arrangement of devices in a system, according to certain embodiments. In some embodiments, a physical location of each of the plurality of peripheral devices may be achieved by sending and receiving location data between the plurality of peripheral devices via RF, IR, or acoustic communication protocols. For instance, a time-of-flight (TOF) measurement between devices (e.g., TOF 1-7) can be used to determine location and/or relative distances between the various devices of the system (100). In some cases, each peripheral/host device may communicate with each other peripheral/host device, or a single peripheral/host device may operate as a hub (keyboard 110) and determine a TOF from itself to each of the other devices in the system, as shown in FIG. 14B. One of ordinary skill in the art with the benefit of this disclosure would appreciate how to implement TOF measurements between devices to determine the physical distance between the various devices (e.g., peripheral devices, host computing devices) in the manner described herein.

Figure 14C:
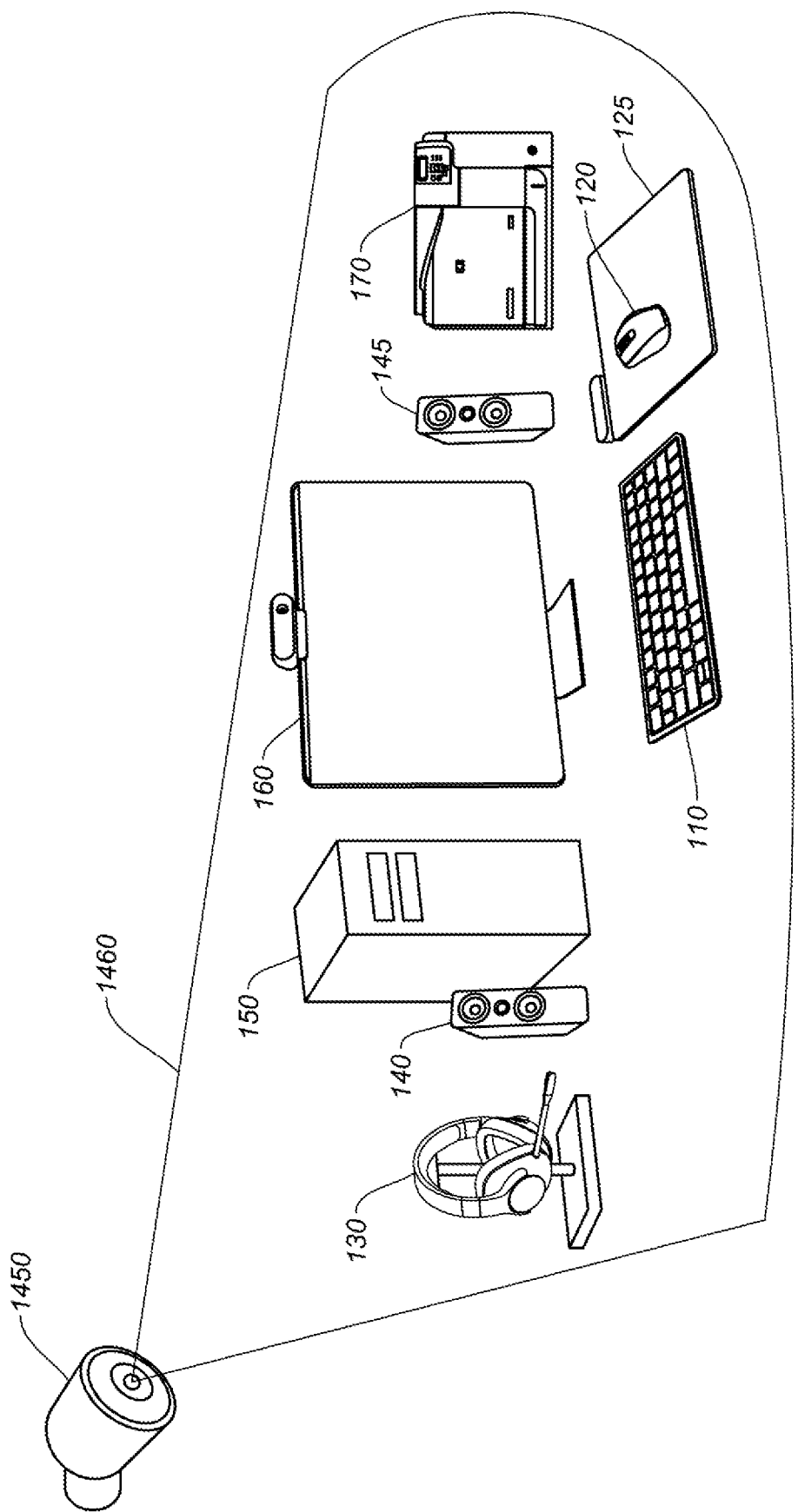
FIG. 14C shows a simplified example of determining a physical location of each of a plurality of peripheral device in a system using one or more image sensors, according to certain embodiments.

FIG. 14C shows a simplified example of determining a physical location of each of a plurality of peripheral device in a system using one or more image sensors, according to certain embodiments. For example, image data from one or more image sensors (e.g., via webcam or security camera, as shown) can include pixel data showing the physical location of each of the plurality of peripheral devices. The image data can include color data and intensity data for each of the visual output elements on the plurality of peripheral devices. In such cases, the method may further include modifying the color output and intensity output of the visual output elements based on the color data and intensity data, such as for a calibration of outputs between peripheral devices. Modifying the color output and intensity output includes at least one of normalizing color output or intensity output of the visual output elements, increasing the intensity output of the visual output elements based on their physical location, and/or modifying a color output or intensity output based on an ambient lighting, or the like.

In some embodiments, images may be used to recognize identifiers associated with a peripheral device. For instance, QR codes on the peripheral devices can be used to identify their type and/or location. In certain implementations, a defined lighting pattern or sequence can be played on the device, e.g., via one or more LEDs, with a particular first color (e.g., red) flashing in a first location (e.g., top left corner of the peripheral device) and a second color (e.g., blue) flashing in a second location (e.g., bottom right of the peripheral device). These flashing LEDs can be used to identify and locate devices (e.g., host computing device, peripheral devices, etc.) via one or images of the lighting pattern and/or sequence.

In some embodiments, the analysis of the relative location of the various devices in the system may be performed by software operating on the host computer, or in some cases on certain peripheral devices with sufficient processing power and resources. In some aspects, the analysis can be a combination thereof. One of ordinary skill in the art with the benefit of this disclosure would appreciate the many modifications, variations, and alternative embodiments thereof.

Figure 15A:
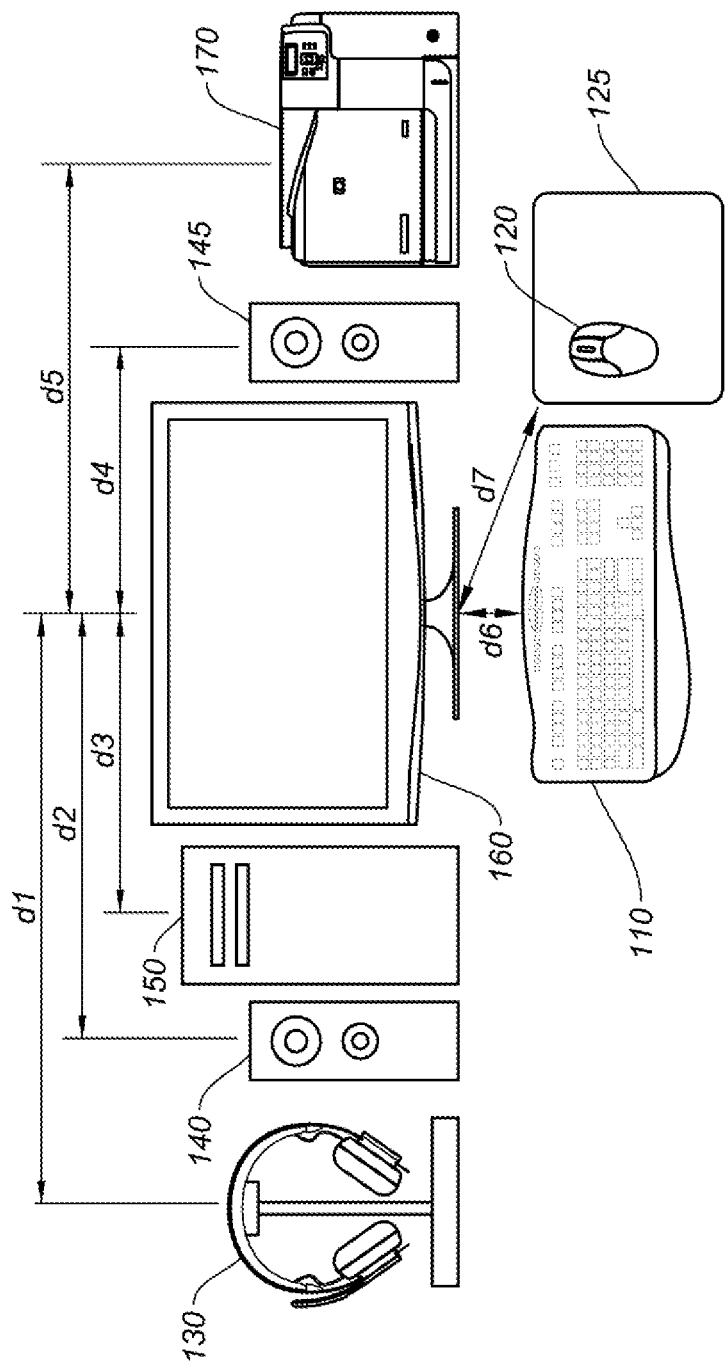
FIGS. 15A and 15B show examples of how a detected spacing between physical devices of a system can be used to control a lighting output schema, according to certain embodiments.
Figure 15B:
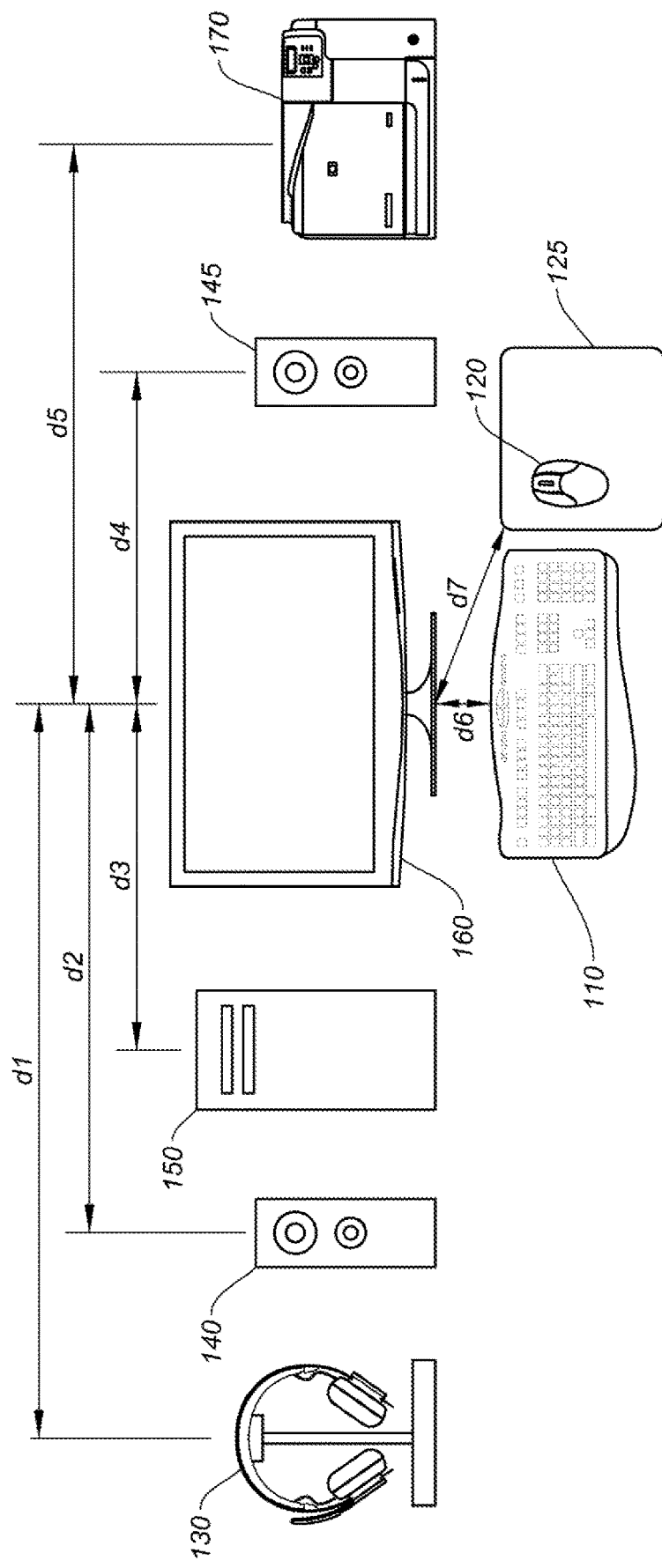

FIGS. 15A and 15B show examples of how a detected spacing between physical devices of a system can be used to control a lighting output schema, according to certain embodiments. The peripheral devices and host computing device are spaced close to one another in FIG. 15A and farther apart in FIG. 15B, as noted by distances d1-d7. In some embodiments, certain lighting output schemas may be configured to traverse some or all of the peripheral devices and host computing device in a particular sequence. For instance, a wave or "breathing" pattern may traverse from left-to-right, right-to-left, center-to-edges, or may travel back and forth between some or all of the devices. A splash or water-like ripple effect (lighting output schema) originating on a user's interaction with a peripheral device (e.g., button click, key press, knob manipulation, etc.) may be propagated throughout the system. In some cases, a projection of a visual display from the user's monitor(s) may be propagated to display on another device. Any of the output schemas described herein, and those not described but understood by those of ordinary skill in the art, could be applied to any of the embodiments presented herein.

FIG. 16 shows how a lighting output schema can be modified based on a location of certain peripheral devices relative to one another, according to certain embodiments. In particular, a notification may be sent to a user when a mouse 120 moves too close to an edge of a mousepad 125 or a keyboard (not shown), which may be important in competitive gaming scenarios. In some embodiments, the user may be notified by flashing a notification on display 160 or other visual output elements on one or more peripheral devices.

In some embodiments, the mousepad 125 can be used like a green screen to detect a current location of the mouse. A smart phone may provide the software with images of the user's desktop to determine peripheral device locations. In some cases, a computer mouse can be tracked in real-time to modify lighting effects. For instance, if a user moves the computer mouse beyond a threshold speed (e.g., 20 cm per second), the speed or activity of a lighting output schema may be enhanced (e.g., sped up, greater brightness, etc.) or if the speed is below the threshold, the effects may be slowed down or less active. In some cases, a splash effect may be applied when certain peripheral devices are moved close together, as described above.

In some embodiments, key assignments may be adjusted depending on relative arrangements of peripheral devices. For example, if a number pad or general purpose keypad is moved close to a joystick or on the right side of a keyboard, its key assignments could change. In some cases, a mouse position may be correlated to another peripheral device. For instance, movement tracking data may be coalesced with input data, image data, TOF data, etc., to affect the lighting output schema.

In another example, depending on the type of peripheral devices, function keys can be assigned to control certain aspects of collocated peripheral devices. For example, if a speaker is collocated with lighting, keyboard keys to control volume can trigger lighting changes on the speaker. In certain embodiments, a filter may be applied to a microphone to account for the sound of collocated mechanical keyboard via sound canceling, as would be appreciated by one of ordinary skill in the art with the benefit of this disclosure. In some cases, wireless charging parameters can be adjusted depending on what peripheral devices are collocated or where they are positioned. In further embodiments, one or more image sensors (e.g., web cam or security camera) can be used to calibrate lighting parameters between devices [above?]. For instance, brightness or colors across the devices may be harmonized based on the image data.

In further embodiments, the operation of certain peripheral devices may be adjusted based on environment. For example, a camera may be used to image a peripheral device's environment and change its settings depending on the surroundings. For example, a computer mouse's working area can be detected and the mouse's DPI/sensitivity settings changed to prevent the user from having the skate the mouse. In other words, the cursor would traverse a screen proportionally to the area available to move the mouse within. In some cases, a mouse sensor can be tuned depending on the surface that it will operate. In another embodiment, a location of a group of game controllers can be detected and assigned to a specific player input (e.g., for multiplayer games). For example, a keyboard and mouse on a right side can be assigned to a first player and a keyboard and mouse on a left side can be assigned to a second player. Lighting output schemas may be driven and/or modulated by games, audio sources (e.g., music, speech, ambient noise volume, etc.), by input devices (e.g., volume roller controls brightness, color selection, balance, EQ levels, I/O selections, etc.), or output devices. In one example, a user may arrange peripheral devices on a virtual desktop including positioning speakers, keyboard and mouse, headset, etc. In such cases, a light scape (e.g., lighting output schema including lighting timing, effects, patterns, etc.) can flow seamlessly across coordinated peripheral devices displaying properly phased waves of lighting effects, as described in the embodiments above.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
   determining a physical location of each of a plurality of peripheral devices communicatively coupled to a host computing device;
   generating a lighting sequence configured to activate visual output elements on the each of the plurality of peripheral devices, wherein the lighting sequence is a time based sequence that traverses the plurality of peripheral devices;
   determining a distance spanning a length across the physical location of the plurality of peripheral devices; and
   modifying a timing parameter of the lighting sequence based on the distance spanning the length across the physical location of the plurality of peripheral devices, the timing parameter corresponding to a total time that the lighting sequence takes to traverse the plurality of peripheral devices.

2. The method of claim 1 wherein determining the physical location of each of the plurality of peripheral devices includes receiving location data from a graphical user interface (GUI) configured to receive inputs from a user, the location data including a physical location of each of the plurality of peripheral devices.

3. The method of claim 1 wherein determining the physical location of each of the plurality of peripheral devices includes receiving location data for each of the plurality of peripheral devices from the plurality of peripheral devices via radio frequency (RF), infra-red (IR), or acoustic communication protocols.

4. The method of claim 1 wherein determining the physical location of each of the plurality of peripheral devices includes receiving image data from one or more image sensors, the image data including pixel data showing the physical location of each of the plurality of peripheral devices.

5. The method of claim 4 wherein the image data includes color data and intensity data for each of the visual output elements on the plurality of peripheral devices, wherein the method further comprises:
   modifying the color output and intensity output of the visual output elements based on the color data and intensity data, wherein modifying the color output and intensity output includes at least one of:
   normalizing color output or intensity output of the visual output elements;
   modifying the intensity output of the visual output elements based on their physical location; or
   modifying a color output or intensity output based on an ambient lighting.

6. The method of claim 1 wherein the visual output elements include at least one of a light emitting diode (LED) or a liquid crystal display (LCD).

7. The method of claim 1 further comprising:
   receiving location data from a position sensor on a computer mouse, the computer mouse being one of the plurality of peripheral devices; and
   modifying a lighting output schema for the computer mouse based on the location of the computer mouse relative to the other peripheral devices of the plurality of peripheral devices.

8. The method of claim 7 wherein modifying a lighting output schema for the computer mouse is further based on the location of the computer mouse relative to its position on a mouse pad.

9. A system comprising:
   one or more processors;
   one or more machine-readable non-transitory storage mediums that include instructions configured to cause the one or more processors to perform operations including:
   determining a physical location of each of a plurality of peripheral devices communicatively coupled to a host computing device;
   generating a lighting sequence configured to activate visual output elements on the each of the plurality of peripheral devices, wherein the lighting sequence is a time based sequence that traverses the plurality of peripheral devices;
   determining a distance spanning a length across the physical location of the plurality of peripheral devices; and
   modifying a timing parameter of the lighting sequence based on the distance spanning the length across the physical location of the plurality of peripheral devices, the timing parameter corresponding to a total time that the lighting sequence takes to traverse the plurality of peripheral devices.

10. The system of claim 9 wherein determining the physical location of each of the plurality of peripheral devices includes at least one of:
    receiving location data from a graphical user interface (GUI) configured to receive inputs from a user, the location data including a physical location of each of the plurality of peripheral devices;
    receiving location data for each of the plurality of peripheral devices from the plurality of peripheral devices via radio frequency (RF), infra-red (IR), or acoustic communication protocols; or
    receiving image data from one or more image sensors, the image data including pixel data showing the physical location of each of the plurality of peripheral devices.

11. The system of claim 10 wherein the image data includes color data and intensity data for each of the visual output elements on the plurality of peripheral devices, and wherein the instructions are further configured to cause the one or more processors to perform operations including:
- modifying the color output and intensity output of the visual output elements based on the color data and intensity data, wherein modifying the color output and intensity output includes at least one of:
- normalizing color output or intensity output of the visual output elements;
- increasing the intensity output of the visual output elements based on their physical location; or
- modifying a color output or intensity output based on an ambient lighting.

12. The system of claim 9 wherein the instructions are further configured to cause the one or more processors to perform operations including:
- receiving location data from a position sensor on a computer mouse, the computer mouse being one of the plurality of peripheral devices; and
- modifying a lighting output schema for the computer mouse based on the location of the computer mouse relative to the other peripheral devices of the plurality of peripheral devices.

13. The system of claim 12 wherein modifying a lighting output schema for the computer mouse is further based on the location of the computer mouse relative to its position on a mouse pad.

14. A non-transitory computer-program product tangibly embodied in a machine-readable non-transitory storage medium that includes instructions configured to cause one or more processors to perform operations including:
- determining a physical location of each of a plurality of peripheral devices communicatively coupled to a host computing device;
- generating a lighting sequence configured to activate visual output elements on the each of the plurality of peripheral devices, wherein the lighting sequence is a time based sequence that traverses the plurality of peripheral devices;
- determining a distance spanning a length across the physical location of the plurality of peripheral devices; and
- modifying a timing parameter of the lighting sequence based on the distance spanning the length across the physical location of the plurality of peripheral devices, the timing parameter corresponding to a total time that the lighting sequence takes to traverse the plurality of peripheral devices.

15. The computer-program product of claim 14 wherein determining the physical location of each of the plurality of peripheral devices includes at least one of:
- receiving location data from a graphical user interface (GUI) configured to receive inputs from a user, the location data including a physical location of each of the plurality of peripheral devices;
- receiving location data for each of the plurality of peripheral devices from the plurality of peripheral devices via radio frequency (RF), infra-red (IR), or acoustic communication protocols; or
- receiving image data from one or more image sensors, the image data including pixel data showing the physical location of each of the plurality of peripheral devices.

16. The computer-program product of claim 15 wherein the image data includes color data and intensity data for each of the visual output elements on the plurality of peripheral devices, and wherein the instructions are further configured to cause the one or more processors to perform operations including:
- modifying the color output and intensity output of the visual output elements based on the color data and intensity data, wherein modifying the color output and intensity output includes at least one of:
- normalizing color output or intensity output of the visual output elements;
- increasing the intensity output of the visual output elements based on their physical location; or
- modifying a color output or intensity output based on an ambient lighting.

17. The computer-program product of claim 14 wherein the instructions are further configured to cause the one or more processors to perform operations including:
- receiving location data from a position sensor on a computer mouse, the computer mouse being one of the plurality of peripheral devices; and
- modifying a lighting output schema for the computer mouse based on the location of the computer mouse relative to the other peripheral devices of the plurality of peripheral devices.

* * * * *